(12) United States Patent
Kuan et al.

(10) Patent No.: US 10,660,344 B1
(45) Date of Patent: May 26, 2020

(54) METHOD OF MAKING A MEAT PRODUCT AND A MEAT PRODUCT

(71) Applicant: TYSON FOODS, INC., Springdale, AR (US)

(72) Inventors: Naikang Kuan, Wheaton, IL (US); Paul Thomas Connor, LeMars, IA (US)

(73) Assignee: Tyson Foods, Inc., Springdale, AR (US)

( * ) Notice: Subject to any disclaimer, the term of this patent is extended or adjusted under 35 U.S.C. 154(b) by 202 days.

(21) Appl. No.: 15/932,274

(22) Filed: Feb. 16, 2018

Related U.S. Application Data

(60) Provisional application No. 62/459,728, filed on Feb. 16, 2017, provisional application No. 62/568,682, filed on Oct. 5, 2017.

(51) Int. Cl.
*A22C 17/00* (2006.01)
*A23L 13/00* (2016.01)

(52) U.S. Cl.
CPC ...... *A22C 17/0046* (2013.01); *A22C 17/0006* (2013.01); *A23L 13/00* (2016.08); *A23V 2002/00* (2013.01)

(58) Field of Classification Search
CPC ... A22C 17/00; A22C 17/0006; A22C 17/002; A22C 17/0033; A22C 17/0046; A23L 1/3103; B26D 2210/02
USPC .......... 452/149, 174, 198; 426/76, 104, 241, 426/243, 296, 438, 480, 512, 513, 518, 426/643, 647
See application file for complete search history.

(56) References Cited

U.S. PATENT DOCUMENTS

| | | | | | |
|---|---|---|---|---|---|
| 2,016,242 | A | * | 10/1935 | Diesbach | B41L 5/08 462/32 |
| 3,636,732 | A | * | 1/1972 | Townsend | D04B 15/58 66/133 |
| 3,717,473 | A | * | 2/1973 | Bissett | A22C 17/006 426/76 |
| 5,418,000 | A | * | 5/1995 | Marmer | A23L 17/00 426/479 |
| 5,464,368 | A | * | 11/1995 | White | A22B 5/0029 426/518 |

(Continued)

FOREIGN PATENT DOCUMENTS

CA         2033789 A1    7/1991

*Primary Examiner* — Richard T Price, Jr.
(74) *Attorney, Agent, or Firm* — McAfee & Taft, A Professional Corporation

(57) ABSTRACT

The present disclosure describes new meat products and new processing and cutting techniques that more effectively utilize the animal carcass. A method of forming a rib-meat product and one or more rib-meat products are disclosed. One rib-meat product includes a plurality of rib bones and a substantially cylindrically-shaped meat portion attached to a second end of each of the rib bones in the plurality of rib bones. The substantially cylindrically-shaped meat portion is a continuous piece of meat originally present on the plurality of rib bones. The substantially cylindrically-shaped meat portion includes a flap portion and a stationary portion, and the flap portion has been detached from each of the first ends of the plurality of rib bones and is substantially wrapped around a stationary portion at the second end to form the substantially cylindrically-shaped meat portion.

46 Claims, 17 Drawing Sheets

(56) References Cited

U.S. PATENT DOCUMENTS

| | | | |
|---|---|---|---|
| 7,175,517 B1* | 2/2007 | Weakley | A22C 21/0038 |
| | | | 452/149 |
| 7,660,715 B1* | 2/2010 | Thambiratnam | G10L 15/065 |
| | | | 704/244 |
| 7,666,075 B1 | 2/2010 | Baker et al. | |
| 7,780,507 B2* | 8/2010 | Gagliardi, Jr. | A22C 17/0046 |
| | | | 452/198 |
| 7,959,500 B1 | 6/2011 | Baker et al. | |
| 8,545,198 B2* | 10/2013 | Artsyukhovich | A61M 1/0058 |
| | | | 417/477.2 |
| 8,727,840 B2 | 5/2014 | Connor et al. | |
| 2014/0272008 A1* | 9/2014 | Wilson | A22C 21/0076 |
| | | | 426/92 |
| 2016/0037788 A1 | 2/2016 | Corbin et al. | |

* cited by examiner

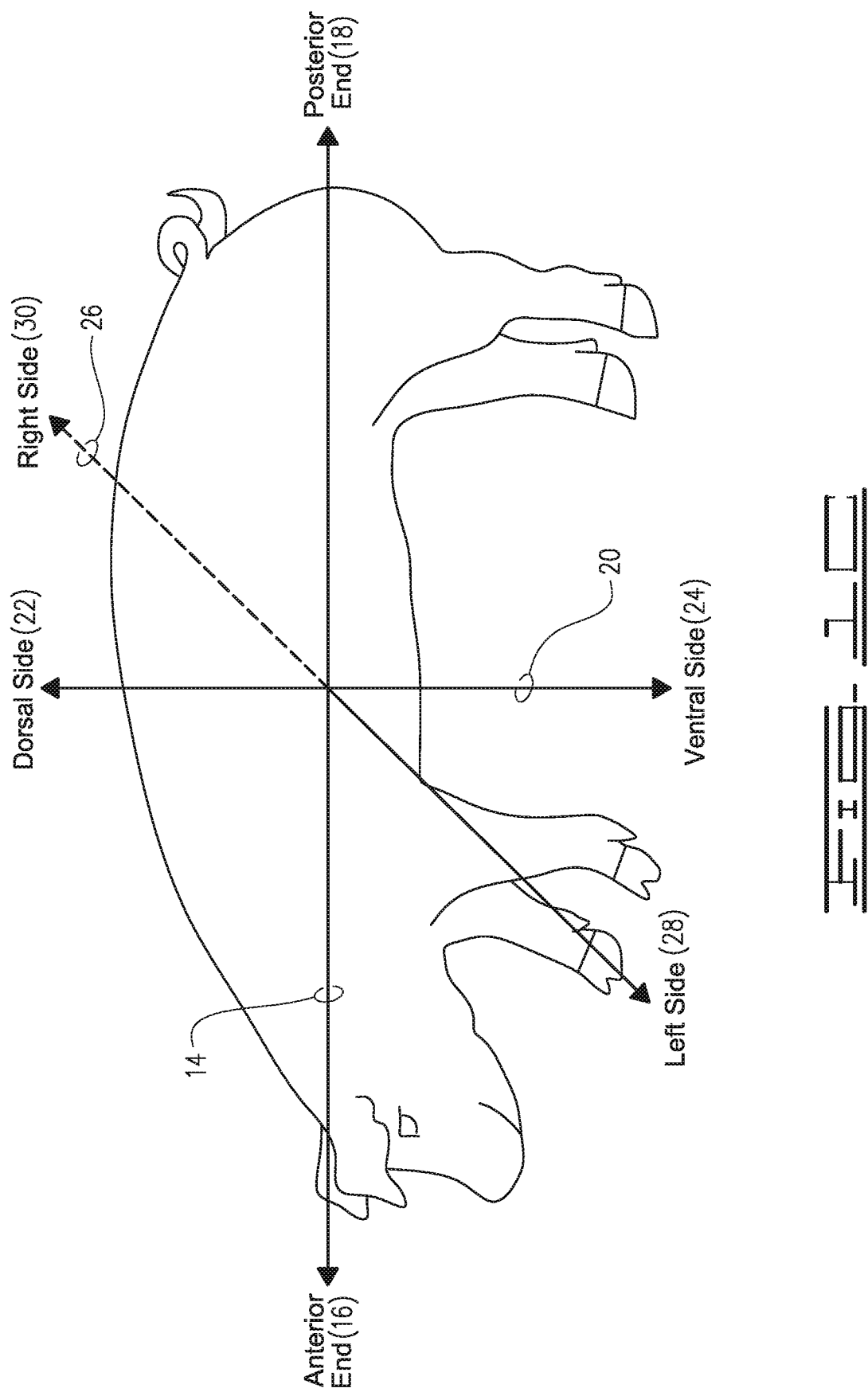

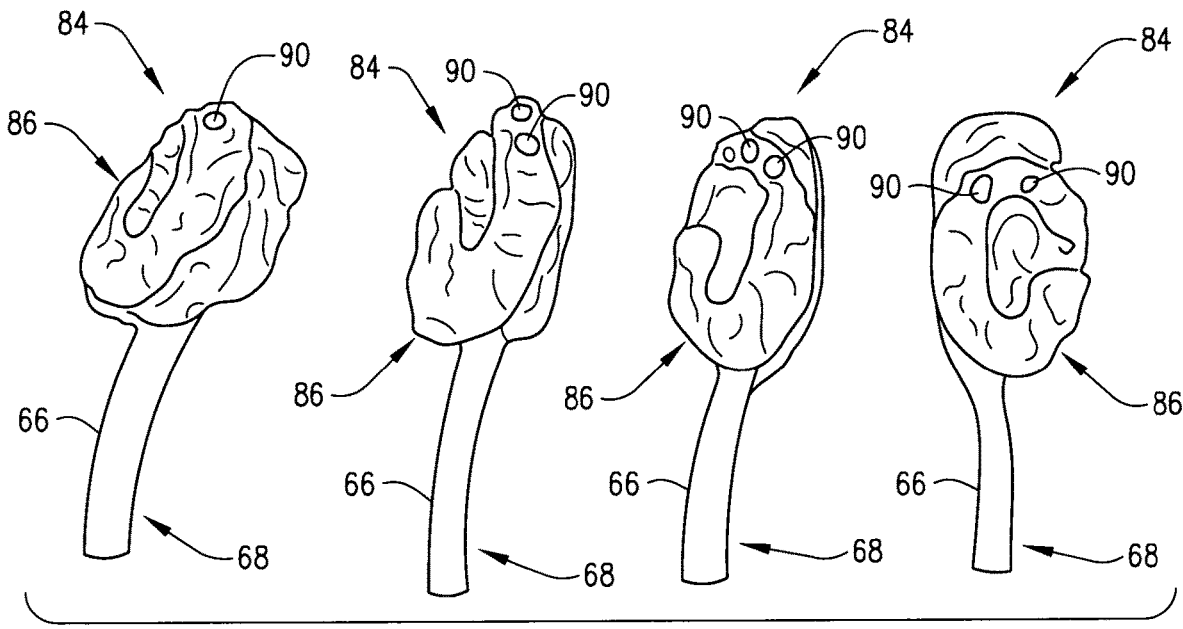
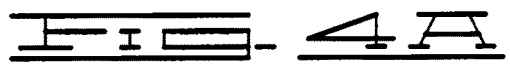
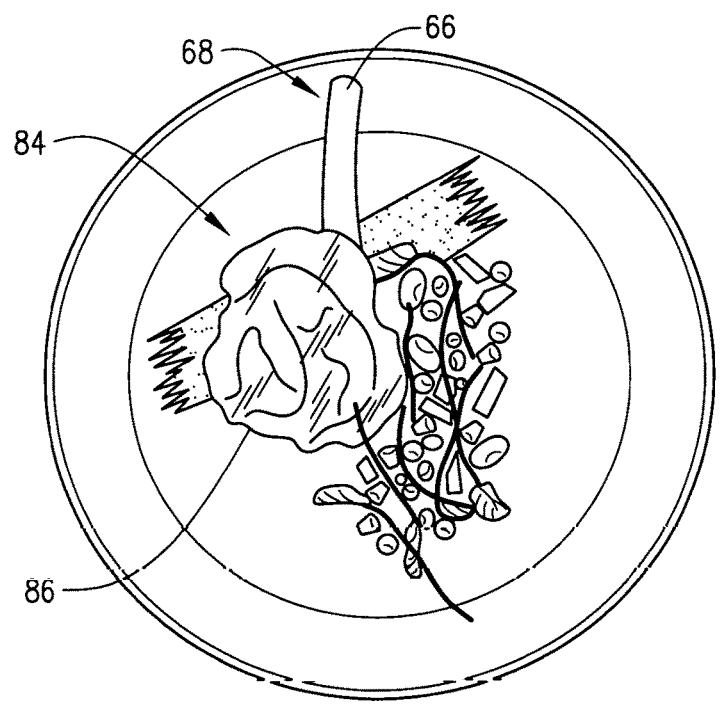
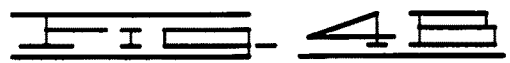

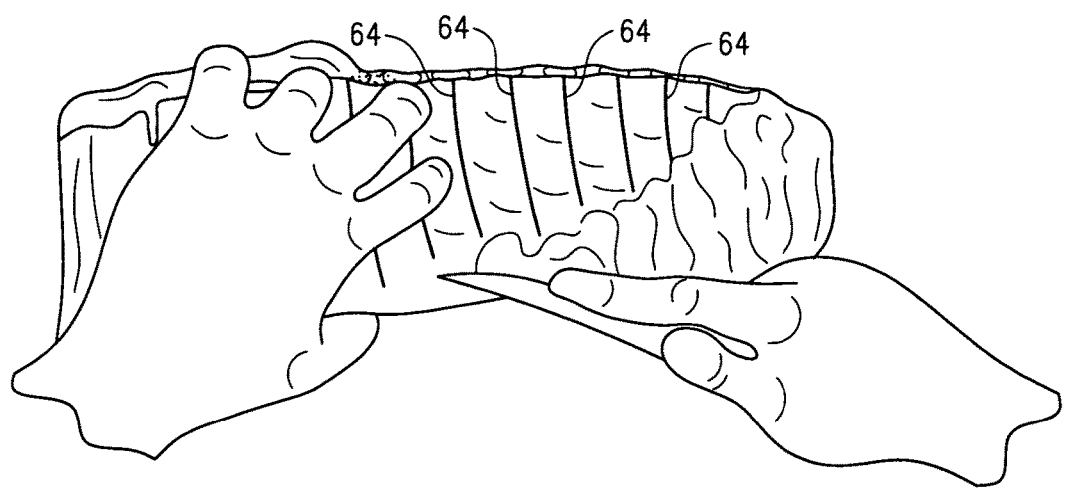
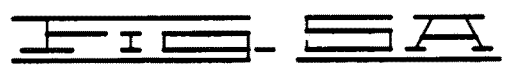
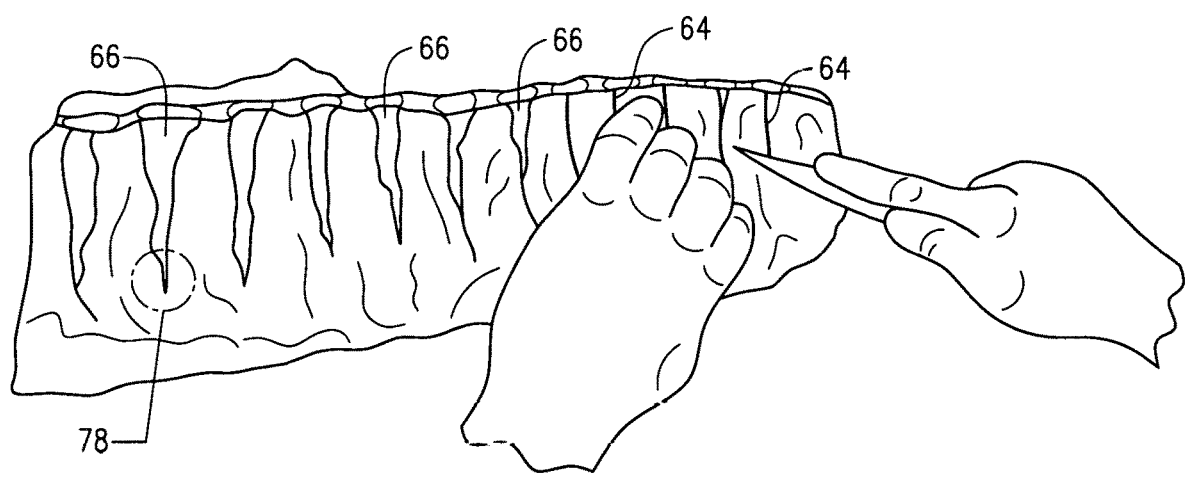

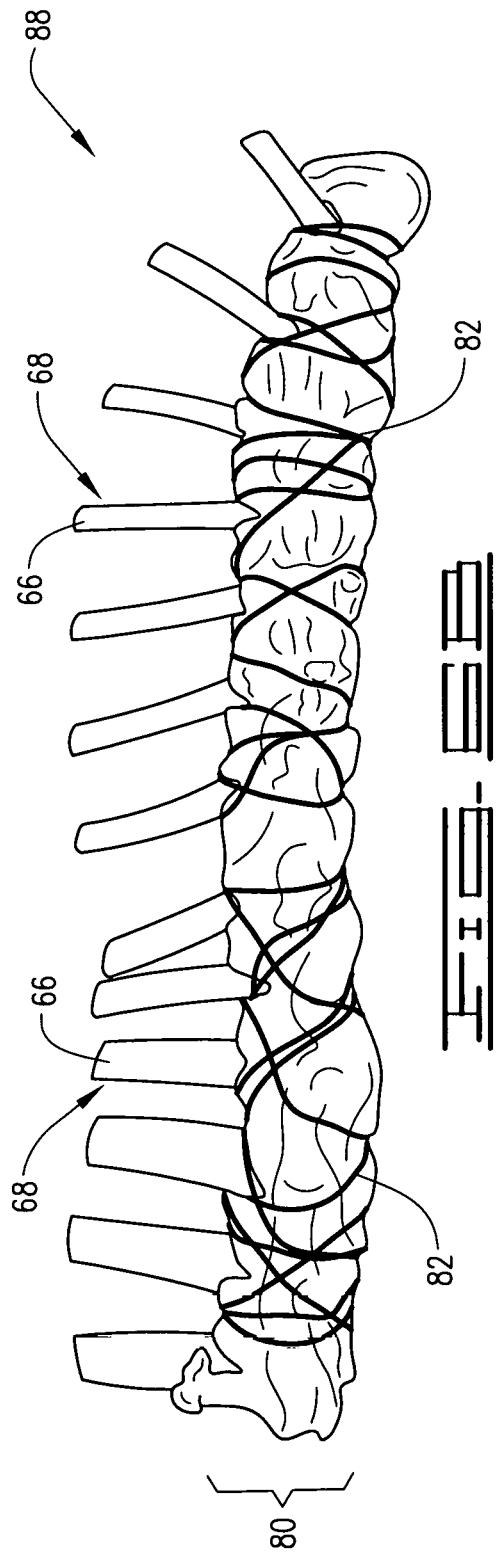
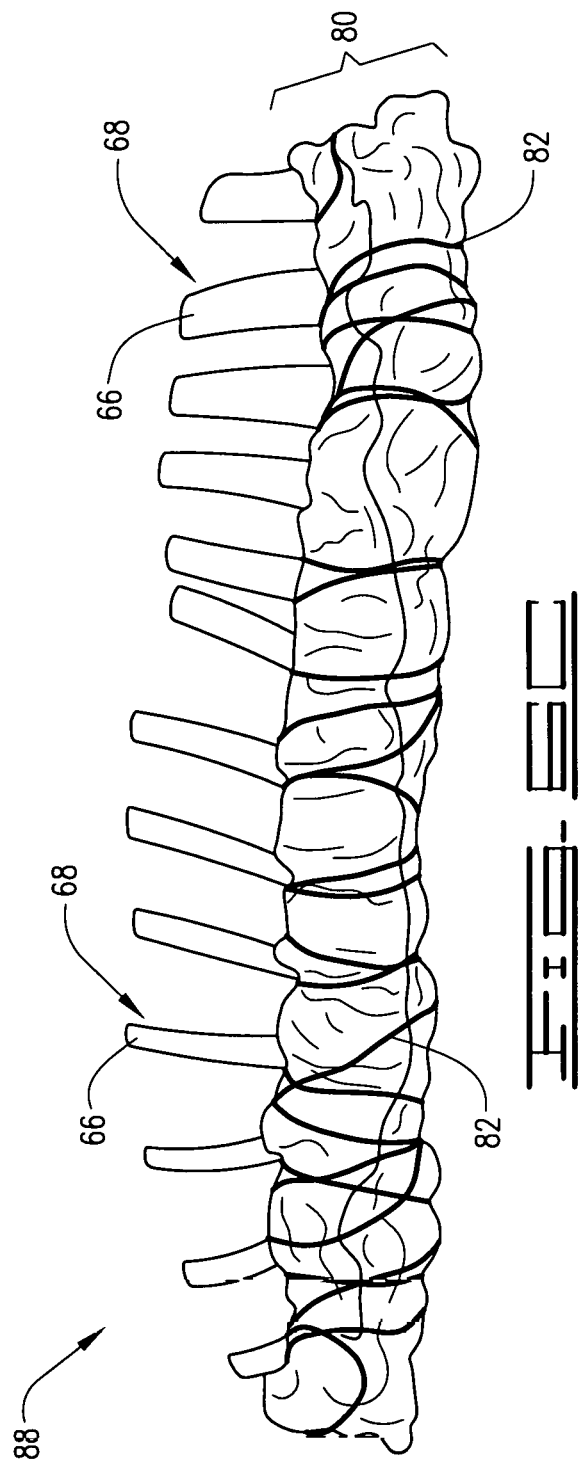
FIG. 5B
FIG. 5C

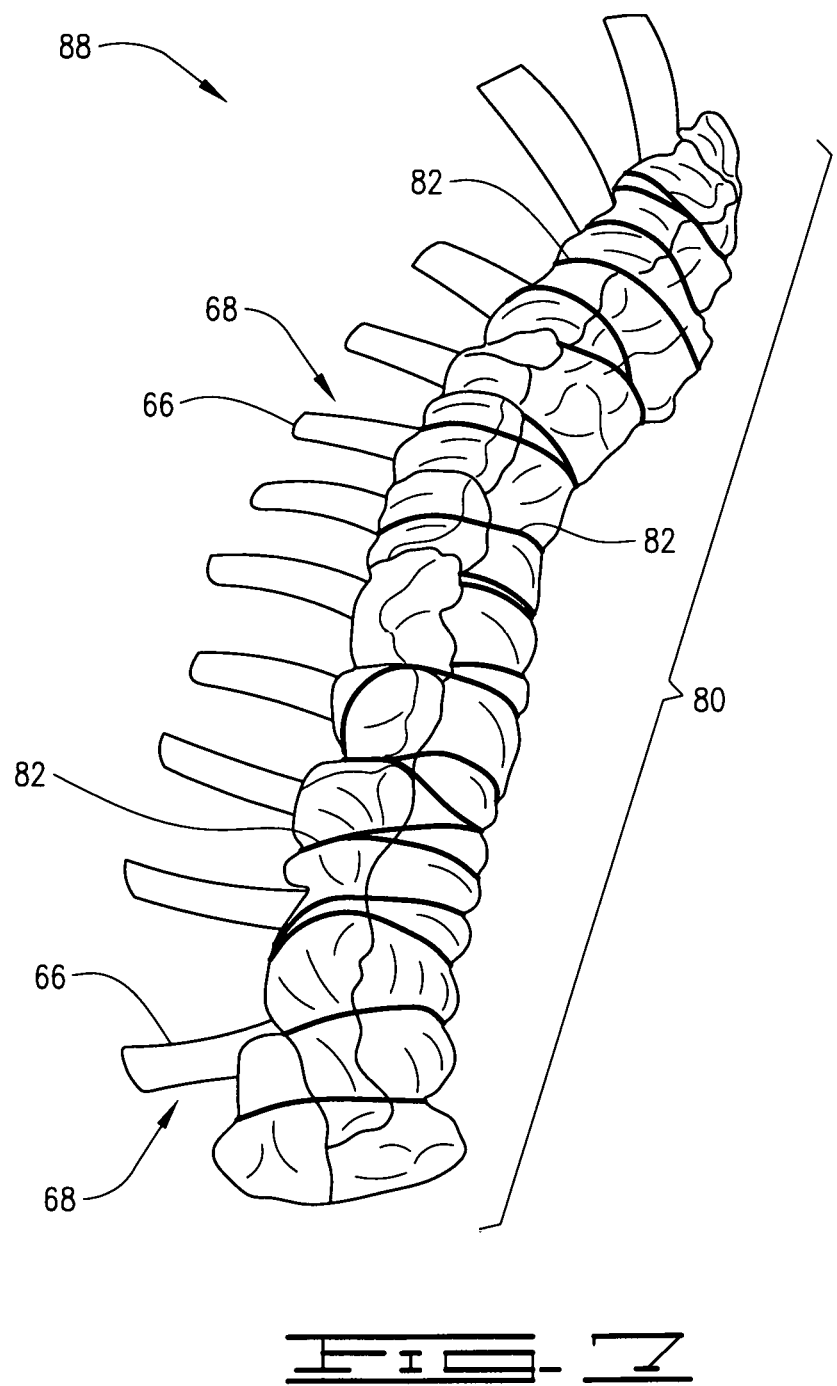

METHOD OF MAKING A MEAT PRODUCT AND A MEAT PRODUCT

CROSS-REFERENCE TO RELATED APPLICATIONS

This application claims priority from U.S. Provisional Patent Application Ser. No. 62/459,728, filed Feb. 16, 2017, and U.S. Provisional Patent Application Ser. No. 62/568,682, filed Oct. 5, 2017, the entire contents of which are each incorporated herein by reference.

BACKGROUND

The meat-producing industry is seeing heavier carcasses than before. As a result of the heavier carcasses, the meat-producing industry, i.e. fabricators, experiences increased costs associated with the processing of the increased-size carcass and the manufacturing of meat products therefrom, including increased labor, shipping, and handling.

For example, with increasing live swine weights, the meat-producing industry is seeing heavier swine carcasses. In the past, the average live weight was approximately 250-270 pounds, now at time of slaughter, swine weigh about 285-300 pounds on average. Increased swine weight directly correlates to an increase in the primal and sub-primal size.

Consumers are generally not interested in buying larger portion sizes, nor are consumers interested in consuming unrecognizable meat products. Efforts to maintain recognizable meat products for consumers and portion sizes that consumers are willing to buy cause the fabricators to not utilize the carcass as fully and/or cost-effectively, e.g. discarding of portions of meat for use in the lesser-valued trim in order to fabricate the more traditional products and thereby experience more decreasing drop credits values. Fabricators also experience increased costs associated with the manufacture of certain labor-intensive meat products and must find ways to offset the higher-cost manufacture of certain meat products.

SUMMARY

The present disclosure describes new meat products and new processing and cutting techniques that more effectively utilize the animal carcass to make new economical, appetizing, and aesthetically pleasing products available to the consuming public in an industry where there has been a scantiness of any new methods, innovations, and products. The new meat products, new processing and cutting techniques and the meat products produced therefrom allow fabricators to more effectively utilize the carcass, control costs associated with manufacture and fabrication of the carcass, and provide new and innovative meat products that can be offered economically and efficiently, including increasing throughput and/or providing the ability to effectively store more meat products within the same space than compared to current traditional meat products. The new meat products, new processing and cutting techniques and the meat products produced therefrom also allow the fabricators to receive economic benefits by increasing the drop credit value, use the previously-discarded meat portions for new products that can be valued up, and maintain the ability to use other portions of the carcass to fabricate other meat products, including current "traditional" meat products.

A method of forming a rib-meat product is disclosed. The method comprises the steps of: scoring each rib bone on a same side of a slab of ribs for a length less than a total length of the rib bone. The method further includes the steps of loosening intercostal meat from each rib bone along the length of each score to produce an intercostal meat flap; and folding the intercostal meat flap in a direction opposite of the same side that the scoring step was carried out upon of the slab of ribs to form a substantially cylindrically-shaped portion of rib-meat spanning the slab of ribs. The method further includes the step of securing the substantially cylindrically-shaped portion of rib-meat and thereby form the rib-meat product.

A meat product produced by the method of paragraph 6 is disclosed.

A method comprising the steps of: on a cavity side of a slab of ribs, scoring each rib bone of the slab of ribs for a length less than a total length of each of the rib bones, each of the rib bones having a first end and a second end is disclosed. The method further includes the steps of loosening intercostal meat from each rib bone along the length of each score; and folding the loosened intercostal meat away from the cavity side of the slab of ribs and toward the second end of each rib bone to substantially wrap the loosened intercostal meat around meat remaining on the second end of each rib bone to form a generally cylindrically-shaped meat portion. The method further includes securing the folded loosened intercostal meat and the remaining meat on the second end together and thereby form a rib-meat product.

A meat product produced by the method of paragraph 8 is disclosed.

A rib-meat product comprising: a rib bone having a first end and a second end; and a meat roulade attached to the second end of the rib bone is disclosed. The meat roulade is a continuous piece of meat originally present on the rib bone, and the meat roulade includes a flap portion and a stationary portion. The stationary portion is adhered to and joined with the second end of the rib bone, and wherein the flap portion has been detached from the first end of the rib bone and is substantially wrapped around the stationary portion. The first end of the rib bone is exposed bone extending from the meat roulade.

A rib-meat product is disclosed. The rib-meat product comprising: a plurality of rib bones, each rib bone having a first end and a second end; and a substantially cylindrically-shaped meat portion attached to the second end of each of the rib bones in the plurality of rib bones. The substantially cylindrically-shaped meat portion is a continuous piece of meat originally present on the plurality of rib bones, and the substantially cylindrically-shaped meat portion includes a flap portion and a stationary portion. The stationary portion is adhered to and joined with the second end of each of the rib bones in the plurality of rib bones, and the flap portion has been partially detached from each of the first ends of the plurality of rib bones. The flap portion is substantially wrapped around the stationary portion. Each of said first ends of the plurality of rib bones is exposed bone extending from the substantially cylindrically-shaped meat portion.

BRIEF DESCRIPTION OF THE DRAWINGS

FIG. 1C illustrates general points of reference pertaining to anatomical axes for quadrupeds.

FIGS. 4A and 4B depict a visual illustration of a cooked rib-meat product produced by the method as applied to a pork carcass.

FIGS. 5A-5I are example visual illustrations of carrying out a method of forming one or more rib-meat products as applied to a pork carcass where the starting material is a St. Louis-style sparerib with the pectoral meat flap and skirt meat flap removed.

FIGS. 6A-6D depict various views of a visual illustration of a secured rib-meat product in an uncooked state of the method depicted in FIGS. 5A-5I.

FIG. 7 depicts a visual illustration of a secured rib-meat product in an uncooked state produced by the disclosed method, where the starting material was a pork sparerib with the pectoral meat flap and skirt meat flap attached.

DETAILED DESCRIPTION

Figure 1A:
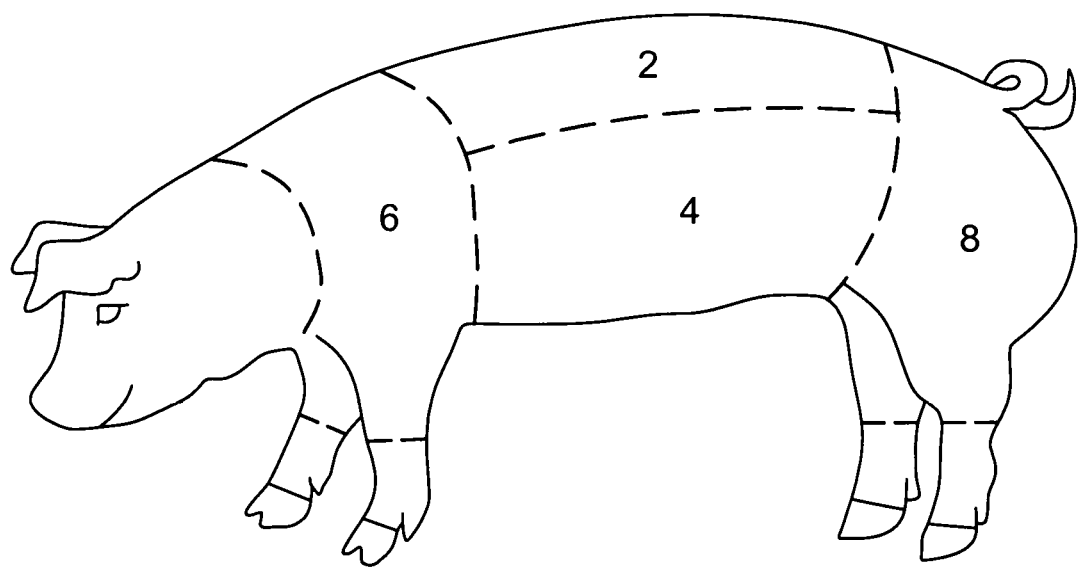
FIG. 1A illustrates primal cuts of a pig.

As used herein, the terms "pig," "swine," "hog," and the like are used interchangeably and refer any animal of the Suidae family commonly used in association with the production and consumption of its meat, i.e. pork. Nothing herein shall limit this disclosure to the domestic pig or any other domesticated animal for which the described processing and cutting techniques may be used. For ease of readability, the present disclosure is made in reference to pigs; however, the disclosed processing and cutting techniques and resulting meat products are also applicable to other animals, including, without limitation, cattle, lamb, and deer, and the applicable animal's associated primal and sub-primal cuts.

As used herein, the phrase "substantially intact" when used in reference to a muscle group includes any associated fat, within a particular portion of interest, e.g., primal, sub-primal, carcass cut. The substantially intact muscle group has approximately 50% or above of the initial muscle and fat material present in that portion of the applicable primal or sub-primal. The substantially intact muscle and fat is not based on a percentage of the total muscle material for the particular muscle present in the entire carcass (if such muscle is found in other primal or sub-primal cuts).

As used herein, the phrase "consisting essentially of" used in connection with a specific muscle or group of muscles refers to the muscle plus the seams associated with muscle(s) and possibly also minor proportions, approximately less than or equal to 10% of other muscles and carcass materials. Carcass materials include all materials, fluids, and bone fragments of the carcass. As used herein, "undesirable components" includes any material or component that may affect the aesthetic and/or appetizing appearance of the meat product to consumers and may adversely affect a pleasant culinary experience by the consumer. Examples of undesirable components may include material such as excess fat, blood clots, bruises, bone chips, cartilage, intermuscular seams, and/or extraneous material present on the meat due to the cutting process, such as, but not limited to, bone fragments that fall on the meat during deboning. As used herein, "associated seams" includes membranes and/or connective tissue, including intermuscular seams. As used herein, the term "consumers" includes all levels of consumers of the meat product, including wholesale consumers, food-industry consumers, retail consumers, and any consumer of any of the foregoing, and individuals that consume the meat product.

The terms of approximation, including, "generally," "substantially," "about," "approximately," and the like, and each of their respective variants and derivatives will be understood to allow for minor variations and/or deviations that do not result in a significant impact thereto. Such terms of approximation should be interpreted according to their ordinary and customary meanings as used in the associated art unless indicated otherwise. Absent a specific definition and absent ordinary and customary usage in the associated art, such terms should be interpreted to be ±10% of the base value. The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

As will be used herein, directional terms, such as "above," "below," "upper," "lower," "top," etc. and/or terms as they pertain to the carcass, including "medial," "lateral," "cavity-side," "skin-side," "bone-side," and "meat-side" illustrate general points of reference pertaining to quadrupeds and/or anatomical axes for quadrupeds and are used for convenience in referring to the accompanying drawings and descriptions thereof and are not intended to limit the scope of the appended claims. For example, with reference to ribs of a carcass, the "cavity-side," "membrane-side," or "bone-side" refer to the portion of the ribs that is medial or closer to the median plane or located along or toward the middle or interior of the carcass; and "meat-side," "lean-side," or "lateral side" refer to the outer portion of the ribs that have more meat thereon and are closer to the lateral side or skin-side or exterior of the carcass and away from the median plane of the carcass.

For illustrative purposes of the present disclosure, the figures depict the disclosed methods, processing steps, and techniques, and the resulting products as performed manually. Such illustration shall not be construed to be limited to being performed manually or solely by hand or other manual techniques. The disclosed methods, processing steps, and techniques may be done manually, automatically, semi-automatically, or combinations of any of the foregoing. The present disclosure includes references to cutting, dividing, and separating steps; such steps are achieved by any method known in the art. Non-limiting examples of cutting, dividing, and separating devices include: automated, manual, or mechanized cutting devices, such as, but not limited to, a knife or knives; rotary knives; saws of all types, including pneumatic saws, hand saws, and band saws; shears; multi-blade cutting systems; fluid jets; pullers; and any combination of one or more of each of any of the foregoing.

Figure 1B:
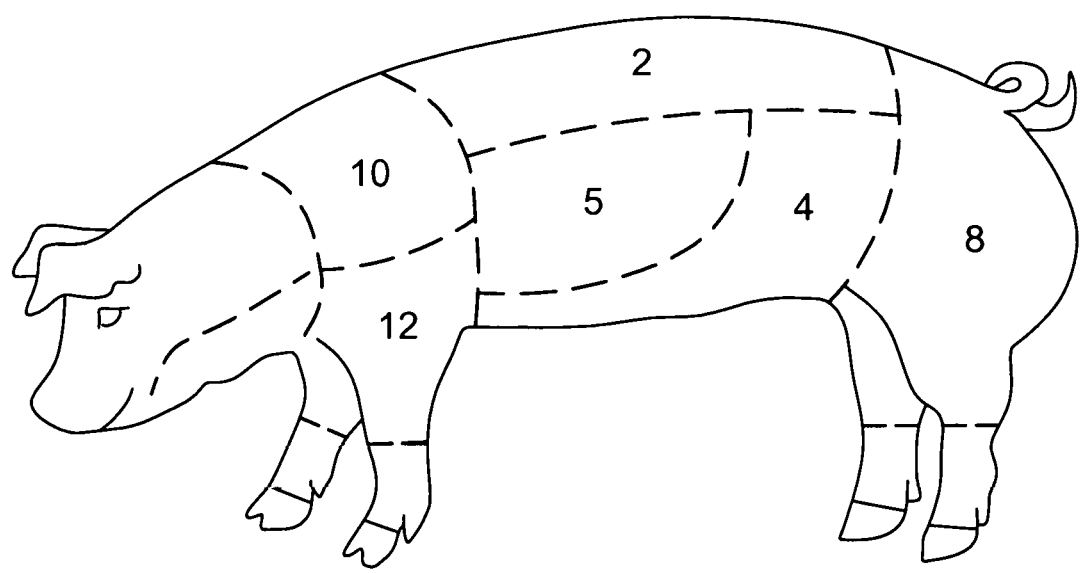
FIG. 1B illustrates some sub-primal cuts of a pig.

FIG. 1A depicts four primal cuts of a pig, the loin 2, belly 4, shoulder 6, and leg or ham 8. FIG. 1B illustrates some sub-primal cuts of a pig, the loin 2, belly 4, sparerib 5, leg or ham 8, blade or Boston butt 10 of shoulder 6, picnic shoulder 12.

FIG. 1C illustrates some general points of reference pertaining to anatomical axes for quadrupeds. For example, the anterior-posterior axis 14 with the anterior end 16 and posterior end 18 labeled in the direction shown. The dorsal-ventral axis 20 with the dorsal side 22 and ventral side 24 labeled in the direction shown. The left-right axis 26 with the left side 28 and right side 30 labeled in the direction shown.

Figure 2:
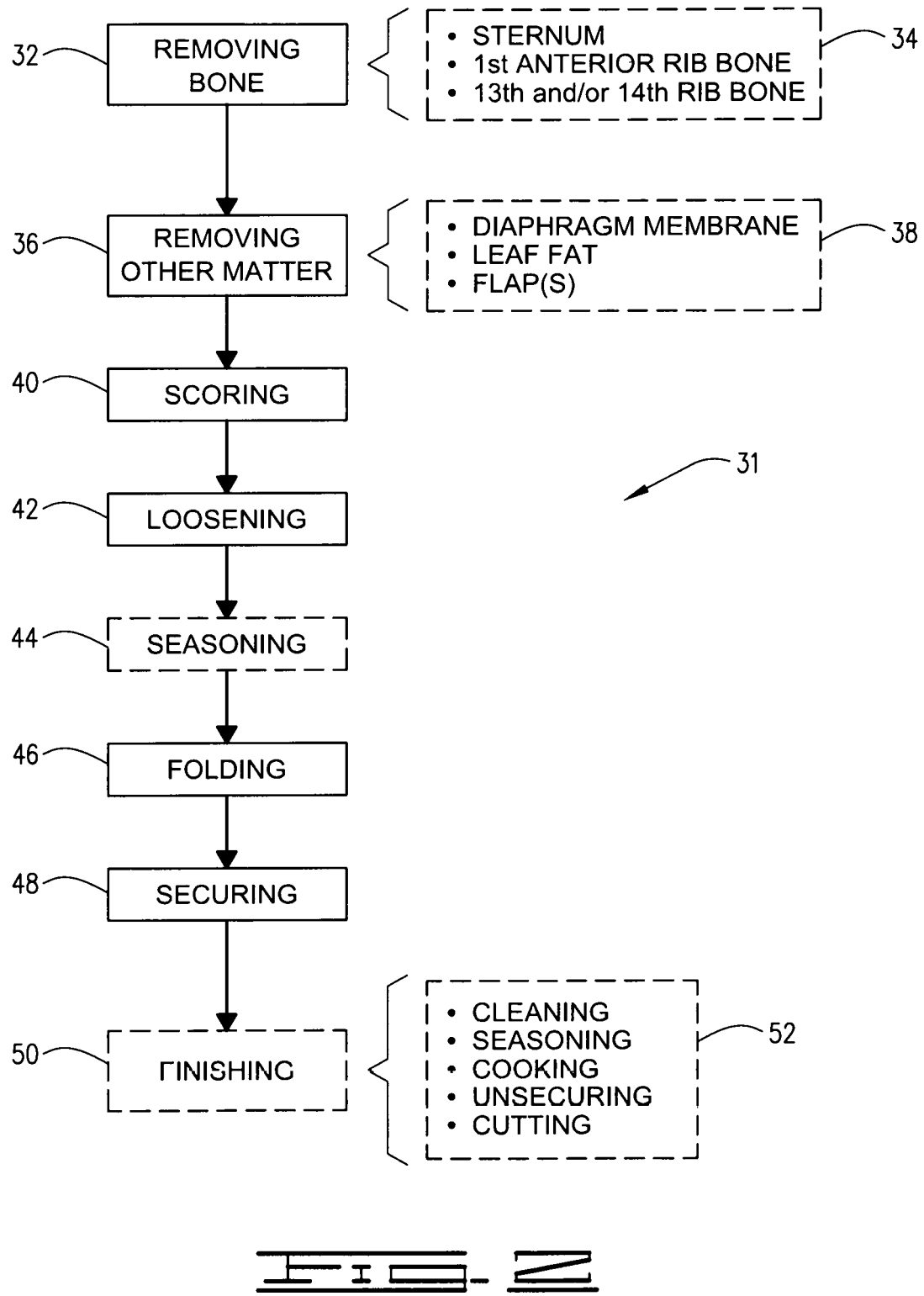
FIG. 2 is an example flow chart for a method of forming one or more rib-meat products.

FIG. 2 is an example flow chart for a method 31 of forming one or more rib-meat products, e.g. 84 and 88. FIGS. 2-7 illustrate various steps and techniques of method 31 and depict various views of one or more rib-meat products produced by method 31 as applied to a pork carcass. For example, FIGS. 3A-3J and FIGS. 5A-5I depict visual illustrations of carrying out method 31 to form one or more rib-meat products as applied to a pork carcass where the starting material 54 and modified starting material 55 are different from each other. For example, with reference to FIGS. 3A-3J and FIG. 7, the modified starting material 55 in connection with method 31 is a sparerib having a skirt flap 58, pectoral flap 60, and flank flap 74. The modified starting material 55 in connection with FIGS. 5A-6D is a St. Louis-style sparerib with the skirt flap 58, pectoral flap 60, and flank flap 74 removed. The modified starting material 55 in connection with FIGS. 4A and 4B is a St. Louis-style sparerib having the pectoral flap 60 attached thereto.

As seen in the figures, rib-meat product 88 has a plurality of rib bones 66 extending from a generally rounded portion of meat located near a second end 70 of each rib bone 66. Each of the rib bones 66 has a first end designated as 68 which are exposed bone portions, e.g. the visible rib bone portion shown in the figures. The generally rounded meat portion 80 is generally cylindrical in shape and spans the entire length of the slab of rib bones 66. FIGS. 3I, 3J, 6A-6D, and 7 depict rib-meat product 88 which may have had different starting material 54 and modified starting material 55 as described above. FIGS. 4A and 4B depict another rib-meat product 84 which has been cooked and cut in association with method 31. As shown in FIGS. 4A and 4B, the resulting cooked and cut rib-meat product 84 has a meat portion on a second end 70 (not visible due to be covered by meat) of the rib bone 66. The meat portion is generally cylindrical in shape, in the form of a roulade or medallion 86. The rib-meat product 84 has a rib bone 66 extending from roulade meat portion 86. Rib-meat product 84 is illustrative of the general shape and configuration when rib-meat product 88 is cut into individual pieces, where such cutting occurs between each rib bone 66.

Method 31 may also be performed on a single rib, a plurality of ribs connected together, and an entire slab or rack of ribs. For ease of reference and discussion herein, a slab of ribs is depicted and will be designated with reference number 54. The plurality of ribs may have 2 or more ribs connected together. The plurality of ribs may include 3-14 rib bones. A slab of ribs may include 3-14 rib bones. The meat products produced by method 31 are comprised of rib meat and, in connection with a pork carcass, can be made by starting with any sub-primal cut (or variations thereof) of back ribs (or loin ribs) from loin 2, spareribs 5, and St. Louis style spareribs (i.e. rib tips removed from the spareribs).

For ease of reference and to avoid duplicity, method 31 will be discussed in connection with both FIGS. 3A-3J and FIGS. 5A-5I, noting, as described above that the starting material 54 and modified starting material 55 are different from each other. As previously mentioned, the starting raw material 54 may have various meat portions removed from it to form a modified starting material 55. For example, if the starting material is spareribs, the pectoral meat flap portion 60 may be removed, the skirt meat flap portion 58 may be optionally removed, the flank meat flap portion 74 may be optionally removed, or combinations thereof.

Prior to commencing the presently described method and obtaining the described rib-meat products, the acquisition and selection of starting raw materials may include one or more of the following, depending on fabricator preference and/or other internal or external guidelines: separating pork spareribs from the pork belly by splitting the intercostal lean (aka the intercostal meat); spareribs may be selected to exclude any spareribs with less than 12 rib bones; spareribs displaying individual rib bones with knots, fractures, blood clots, or other undesirable components and materials may be excluded; spareribs with lean-side snowballs (i.e., exposed fat on the meat-side) greater than 4.0 square inches may be excluded; and spareribs displaying bruising, peel outs, lung tissue or extraneous defects may be excluded. In addition, the starting material may include removal of any partial or split rib bones on the shoulder or flank ends. The foregoing was in connection with spareribs and exemplary in nature; such disclosure should not be limited and the presently described method and products may be formed from other rib primal and rib sub-primal cuts of various animal carcasses.

With reference to FIG. 2, method 31 generally comprises a scoring step 40, a loosening step 42, a folding step 46, and a securing step 48. Method 31 may also include the steps of removing bone 32 and removing other matter 36 prior to scoring step 40. Method 31 may also include a seasoning step 44 after loosening step 42 and before folding step 46. Method 31 may include a finishing step 50, where such finishing step 50 may include one or more of the following: cleaning, seasoning, cooking, unsecuring, and cutting, to produce one or more rib-meat products 84 and/or 88 (the foregoing labelled as box 52).

Depending upon the form and condition of starting material 54, method 31 may include a removing bone step 32 and/or removing other matter step 36 (not depicted). For example, if the starting material is a slab of spareribs, the removing bone step 32 may include one or more of the following: removing the sternum bone 56 while leaving the edible rib meat, e.g. the adjacent pectoral muscles (pectoralis profundi) and associated cartilages substantially firmly attached to the sparerib and substantially intact; removing the last floating rib bone or bones 62 of the sparerib (which are generally more cartilage than bone and generally smaller than the other rib bones on the sparerib slab); and removal of the first rib bone 66 on the anterior end 16 of the sparerib if the first rib bone is a partial (incomplete) or splintered rib bone 66 (the foregoing labelled as box 34). Preferably removal of any bones is done as close as possible to the bone to be removed in order to leave as much intercostal meat as possible on the slab.

With reference to FIG. 2, step 36 of removing other matter may include diaphragm membrane removal, removal of other membranes, leaf fat removal, and one or more flap removal, or combinations thereof (the foregoing labelled as box 38). For example any diaphragm membrane removal includes removal of diaphragm membrane tissue attached to the diaphragm muscle. The removal of the diaphragm member may be to less than about 0.2 inch width by about 0.2 inch length. Any loose or firmly attached internal leaf fat remaining in the internal cavity may also be removed. Preferably substantially all or all heart and leaf fat are removed. In the event the skirt flap 58 is to remain attached, then it is preferable that skirt flap 58 remains firmly or substantially firmly attached to the sparerib despite the removal of the other materials from the sparerib.

Figure 3A:
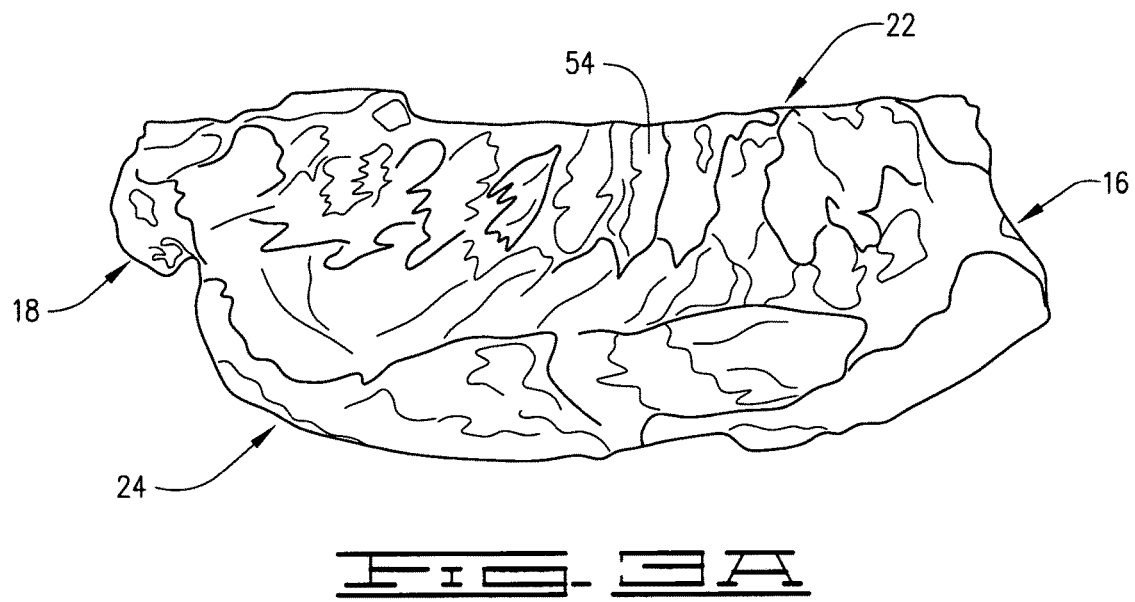
FIGS. 3A-3J are example visual illustrations of carrying out a method of forming one or more rib-meat products as applied to a pork carcass.
Figure 3B:
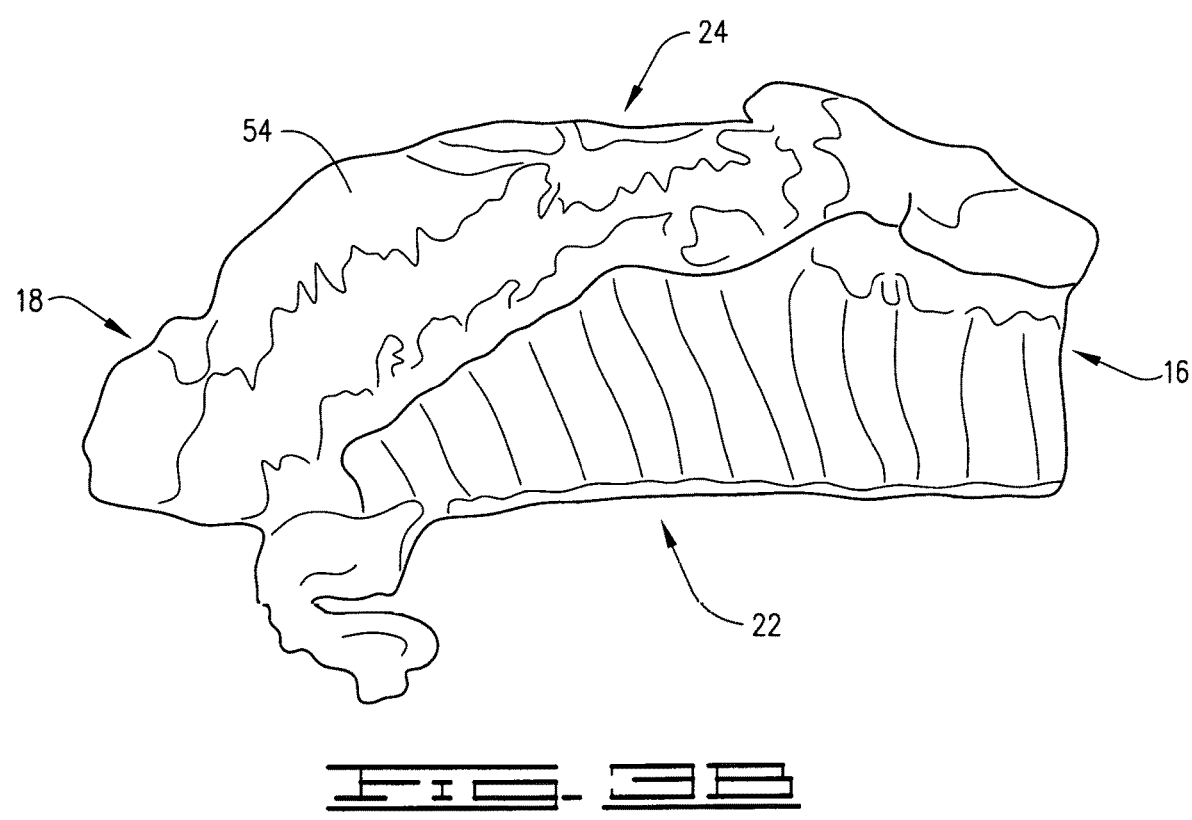
Figure 3C:
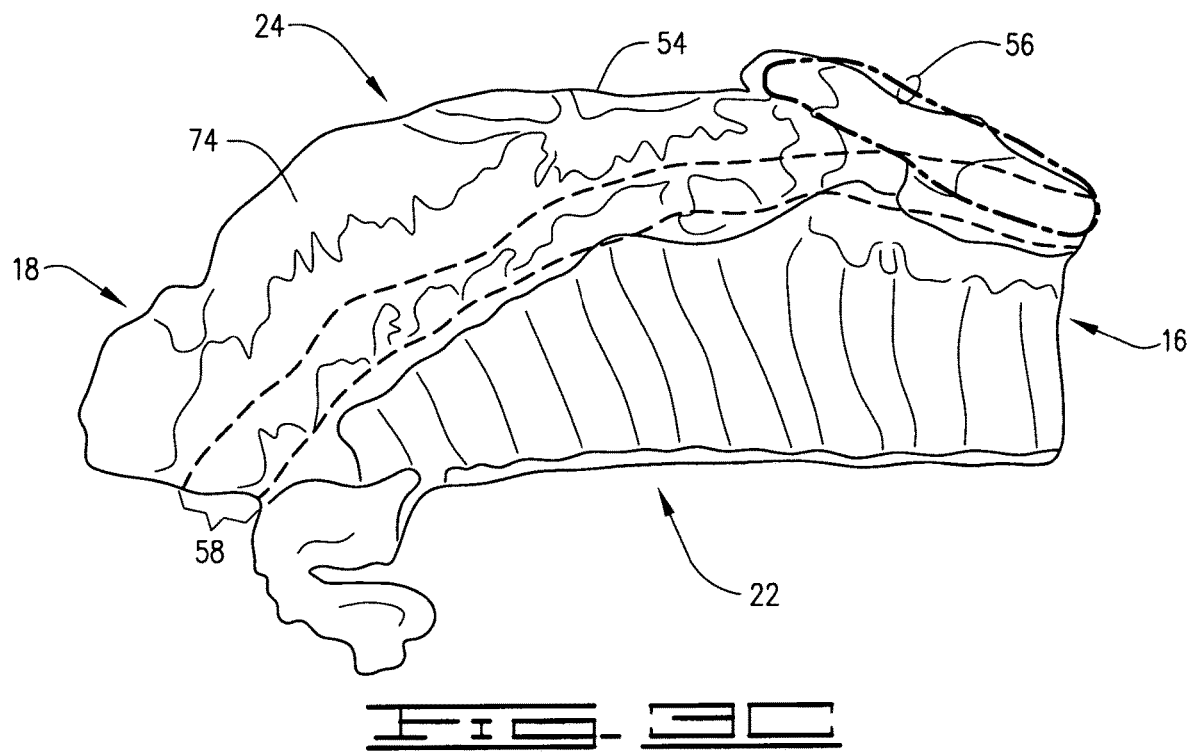
Figure 3D:
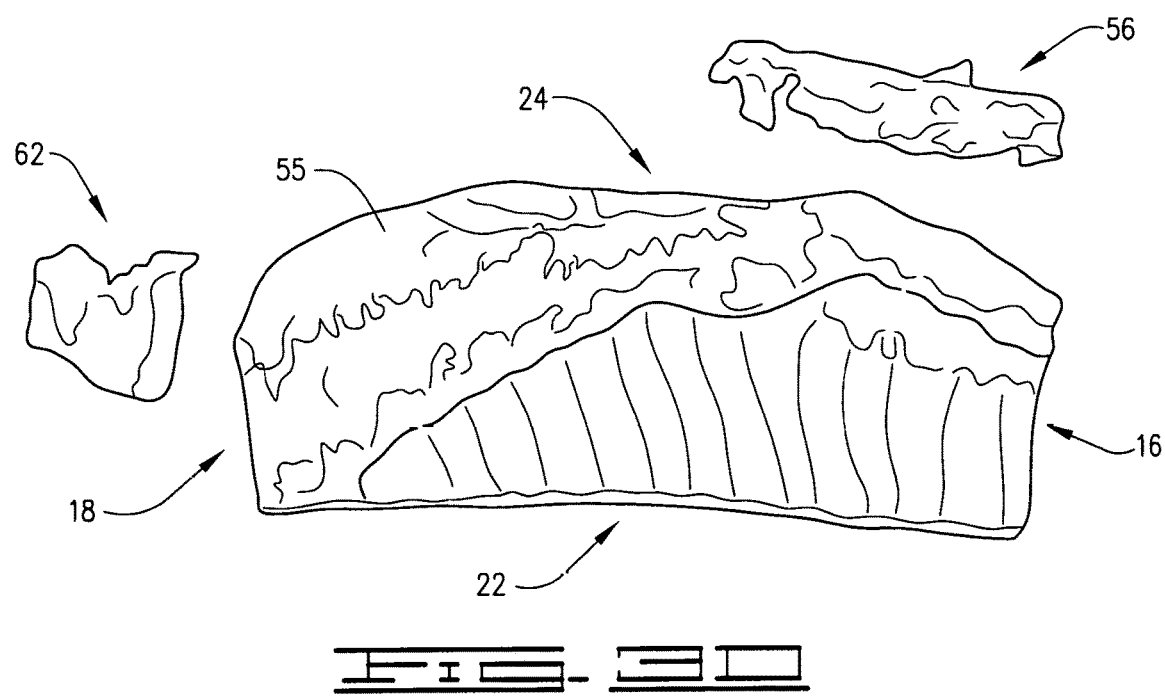

For example, FIG. 3A is illustrative of a meat-side starting material 54 depicted of a sparerib slab. FIG. 3B depicts a bone-side view of starting material 54 depicted in FIG. 3A, where the sparerib slab includes a sternum bone 56, skirt flap 58, pectoral flap 60, and flank flap 74. FIG. 3C is a marked-up view of FIG. 3B with the sternum bone 56, skirt flap 58, pectoral flap 60, and flank flap 74 labelled as shown. FIG. 3D is illustrative of step 32 with the removal of sternum bone 56 and the removal of one or more of the floating rib bones 62 to provide a modified starting material 55 sparerib.

Figure 3E:
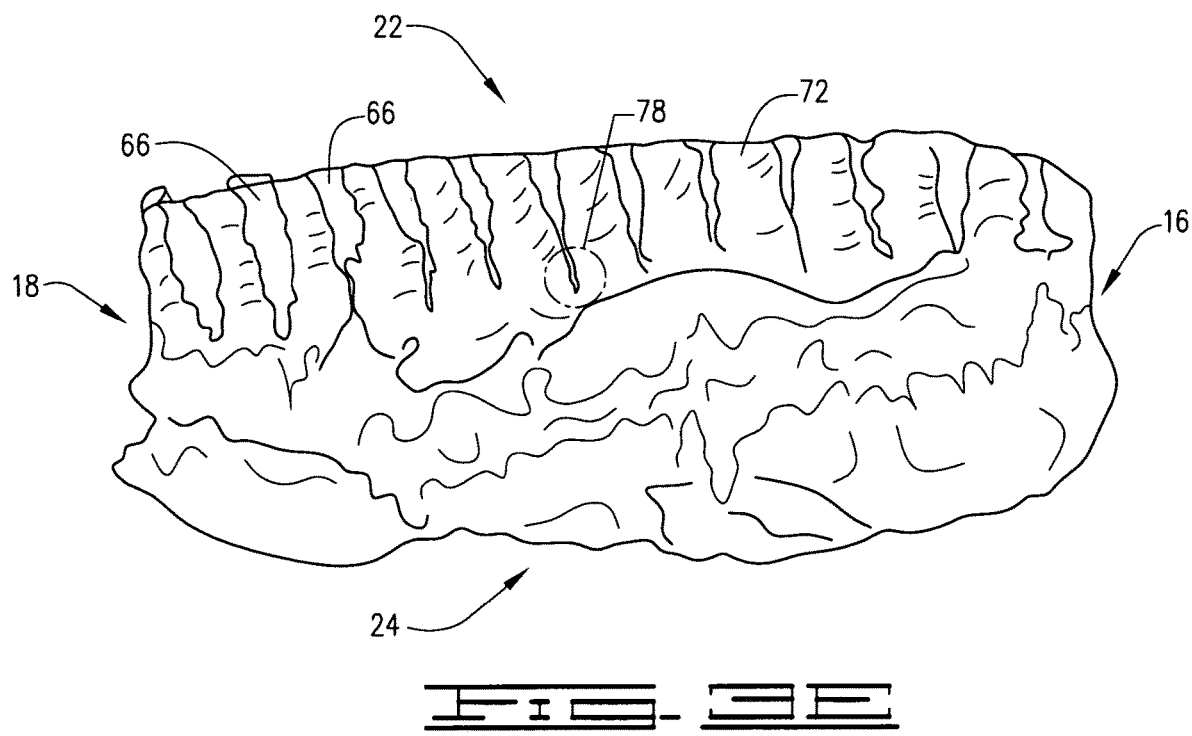

Method 31 includes a scoring step 40. Scoring step 40 includes scoring 64 each individual rib bone 66 on a same side of a slab of ribs for a length less than a total length of the applicable rib bone 66 being scored. For example, scoring step 40 is depicted in FIGS. 3E and 5A showing score 64 on the cavity-side of the slab. Score 64 is for a length less than the total length of the applicable rib 66 and stops at the area generally designated and labelled as 78 shown in FIG. 3E and FIGS. 5B-5D. For example, the length of score 64 of each rib bone 66 is approximately two-thirds of the total length of the rib bone 66 between a first end 68 of the rib bone 66 and a second end 70 of the rib bone 66. Second end 70 is shown in FIGS. 3I and 3J as it is the portion of rib bone 66 covered by meat and not exposed, where the stationary meat portion or meat not loosened from rib bone 66 remains substantially attached, adhered to and joined with second end 70 of the applicable rib bone 66. For example, the length of score 64 of each rib bone 66 is between a first end 68 of the rib bone 66 to a portion of said rib bone substantially near and not including a union of costal cartilage and bone on the rib bone 66.

For example, the orientation of the incision or score 64 of the rib bone 66 in method 31 may be as follows: for a sparerib, from dorsal side 22 toward ventral side 24 and the stationary meat remaining fixed and attached to the rib bone 66 is located the portion toward the ventral side 24 of rib bone 66 and designated generally as the second end 70. For example, for a back rib and the St. Louis style sparerib as the starting material, scoring step 40 may be from either end of the rib bone 66, i.e. from the ventral side 24 toward the dorsal side 22 or from the dorsal side 22 toward the ventral side 24.

Score 64 may be done using a straight knife (or other suitable instrument) to mark the pleural membrane at each of the rib bones 66, preferably at approximately the center of each of the rib bones 66. Scoring step 40 may be done to expose approximately up to two-thirds of the length of each individual rib bone on the cavity (internal) side of the rib bones (if the cavity-side is the side scored). Scoring step 40 may also be performed by providing score 64 on the meat-side of the rib bone 66 which will result in the intercostal meat flap 72 being folded and substantially wrapped around the stationary meat portion resulting in the membrane being located on the inside of the generally cylindrically-shaped meat portion, e.g. within generally cylindrically-shaped meat portion 80 of rib-meat product 88 or within roulade 86 of rib-meat product 84 as opposed to the membrane being on the exterior side of generally cylindrically-shaped meat portion 80 or roulade 86 when the cavity-side of the rib bones 66 is scored. FIG. 3E and FIGS. 5B-5D depict the exposed rib bone 66 and the beginning of the formation of intercostal meat flap 72 resulting from scoring each rib bone 66.

Method 31 includes loosening intercostal meat from each rib bone 66 along the length of each score 64 to form intercostal meat flap 72.

Figure 5C:
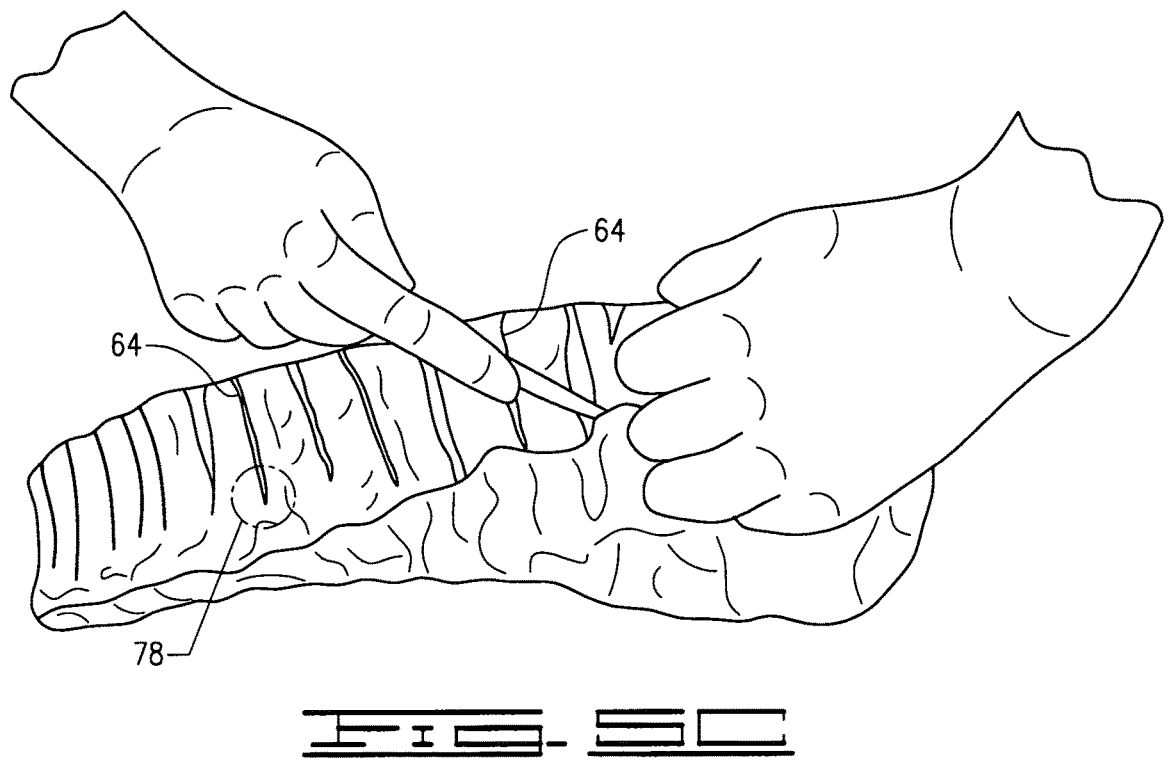
Figure 5D:
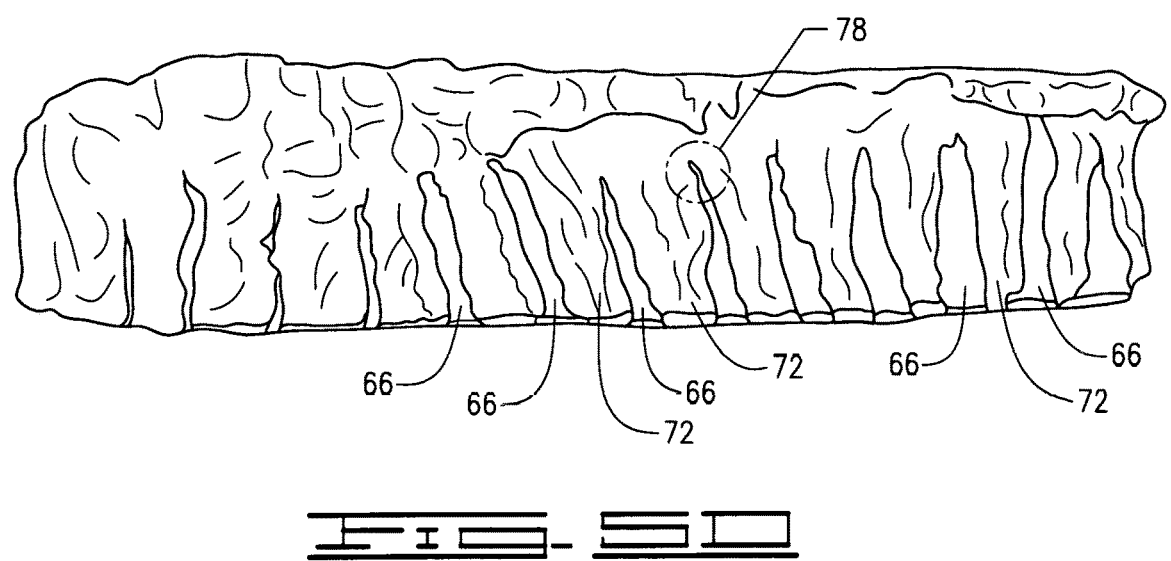
Figure 5E:
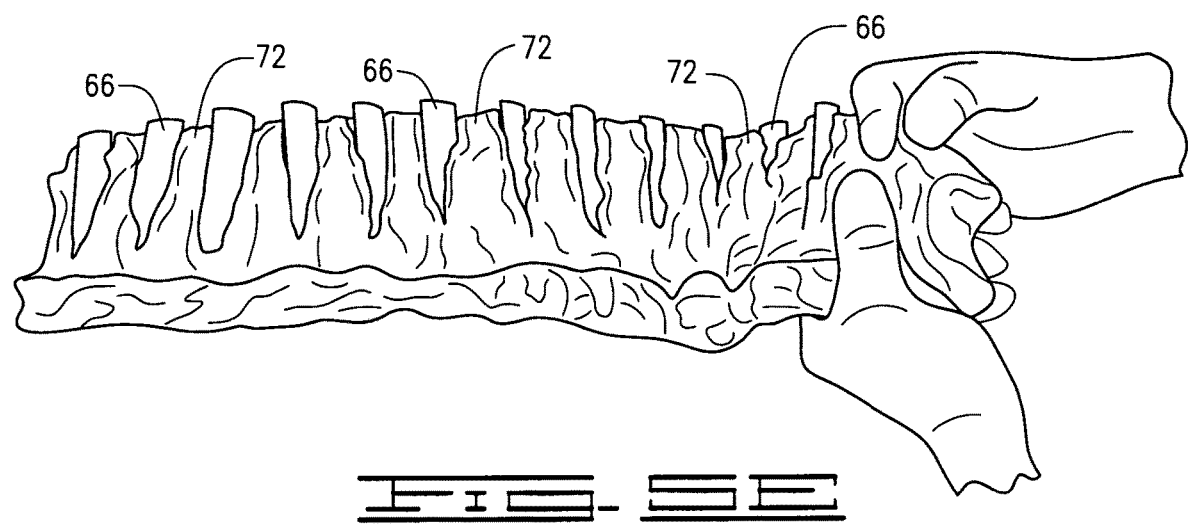
Figure 5F:
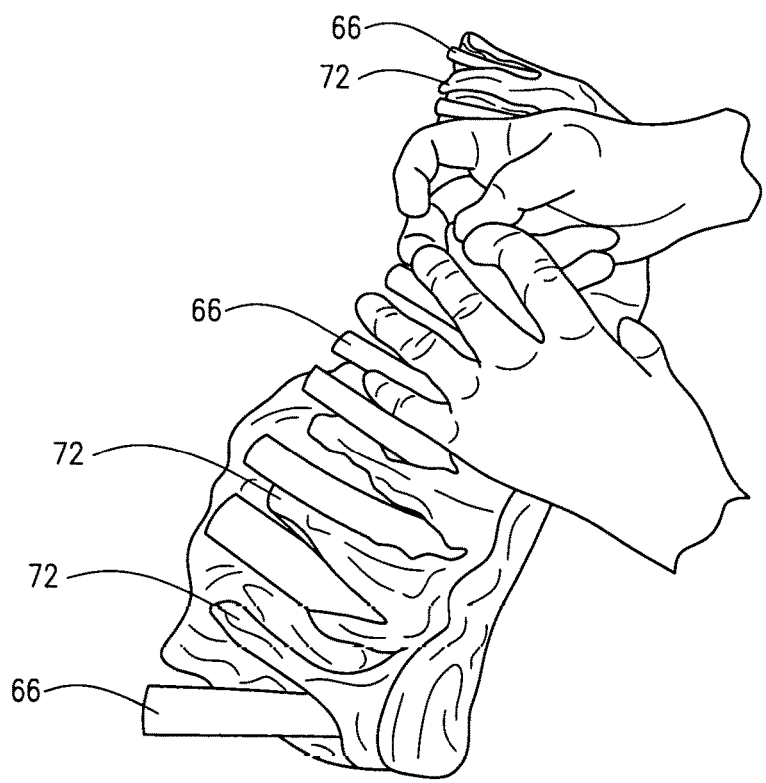
Figure 5G:
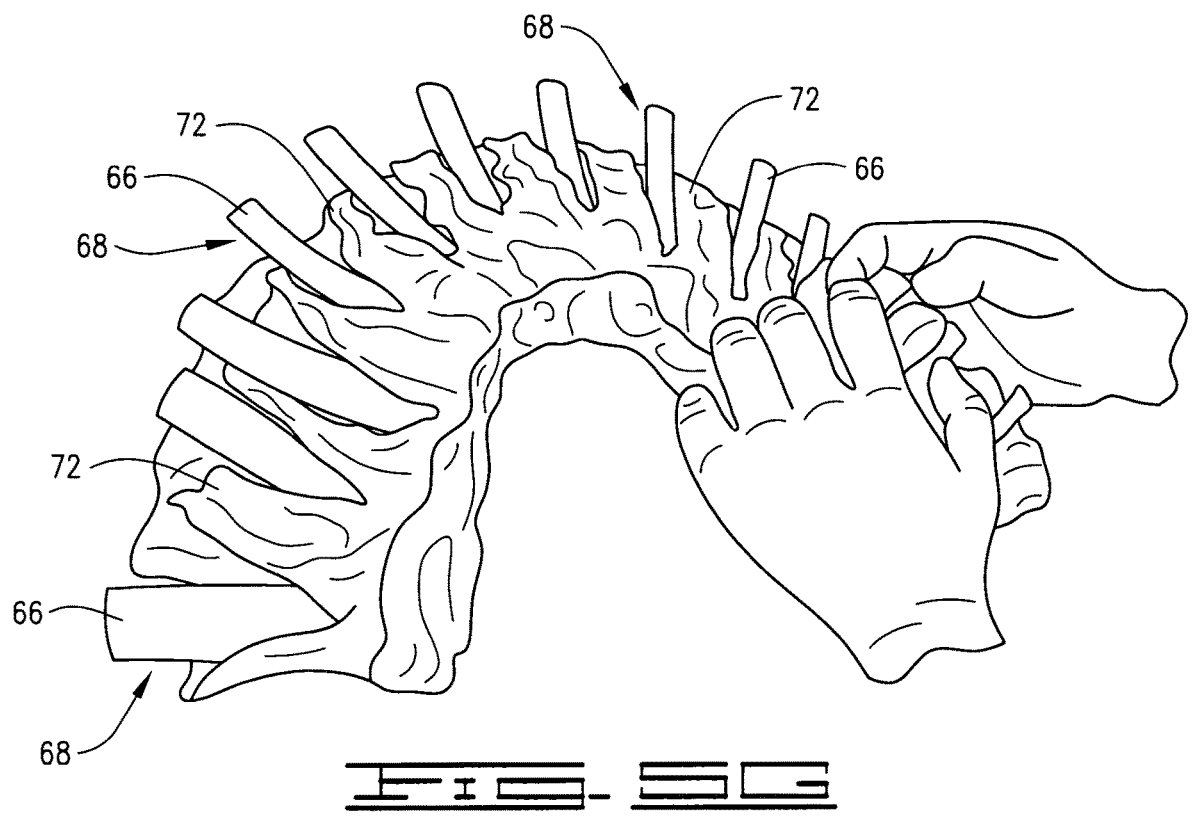

FIGS. 5E-5G depict loosening step 42. Step 42 includes loosening the intercostal membrane and meat along the length each score line 64. The loosening step 44 can include pushing and/or pulling the intercostal membrane and meat off each bone 66 and the manipulation of the bone to free the intercostal meat therefrom to create a flap of intercostal meat. For example, the pleural membrane lining, adjacent the intercostal meat (e.g. intercostales externi and intercostales interni, collectively intercostal) is loosened (preferably as completely as possible) from the entire circumference of each of the individual rib bones 66 using a short straight knife (or other suitable instrument) and/or a sharp meat hook (or other suitable instrument).

Figure 3F:
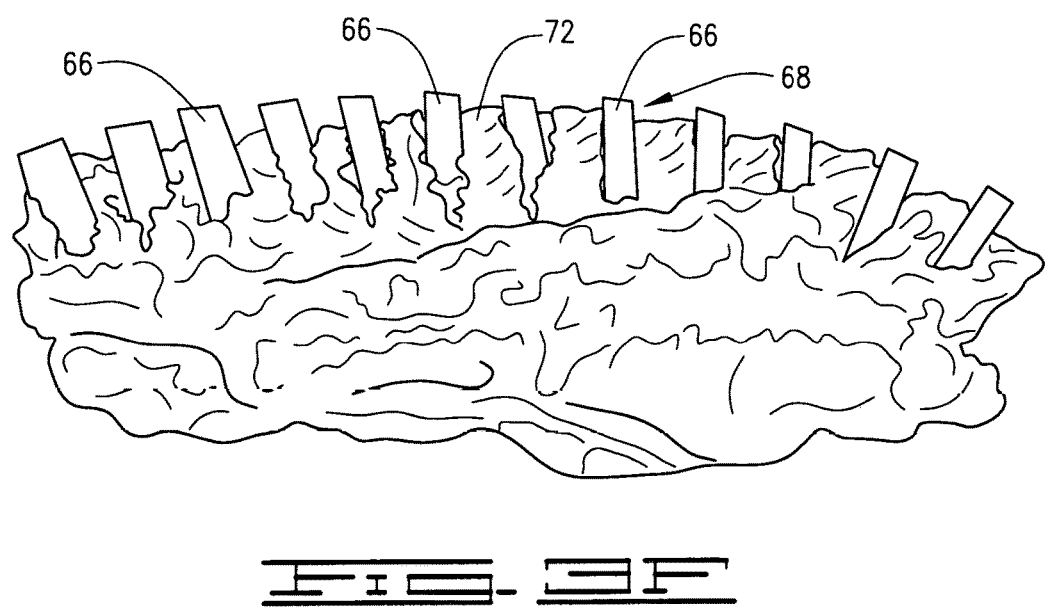
Figure 3G:
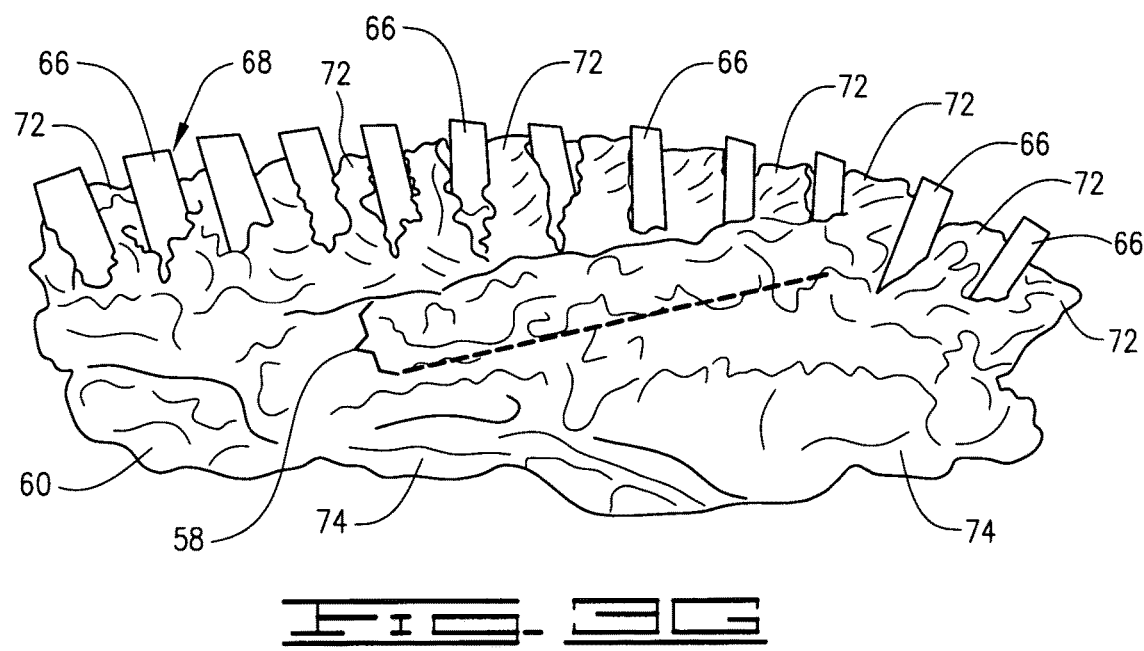
Figure 5H:
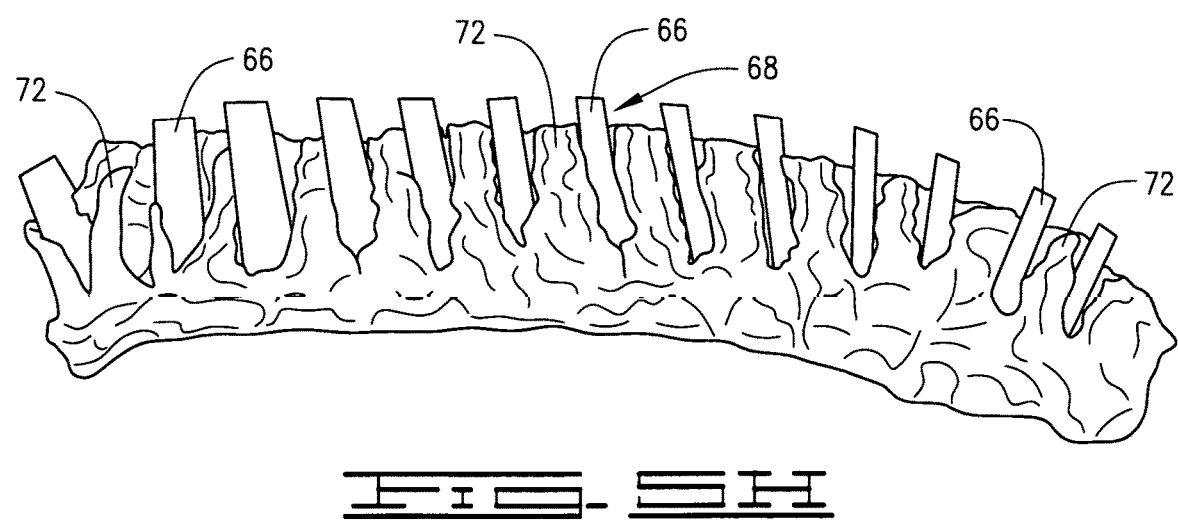

FIGS. 3F, 3G, and FIG. 5H depict the slab resulting from the loosening step 42. The loosened intercostal meat of each rib bone 66 can be referred to collectively as the loosened intercostal meat flap 72. With reference to FIG. 3G, which is a marked up version of FIG. 3F, intercostal meat flap 72 is pushed through the individual rib spaces to the meat-side of the sparerib (also depicted in FIGS. 5E-5H). As shown in FIG. 3G, four separate meat flaps are depicted, including pectoral flap 60, intercostal meat flap 72, skirt flap 58, and flank flap 74.

The remaining portion of meat along the rib bone portion that was not scored is still substantially attached to the rib bone 66 in the area designated with reference numeral 70. This portion of meat is also referred to as the stationary meat portion.

Figure 3H:
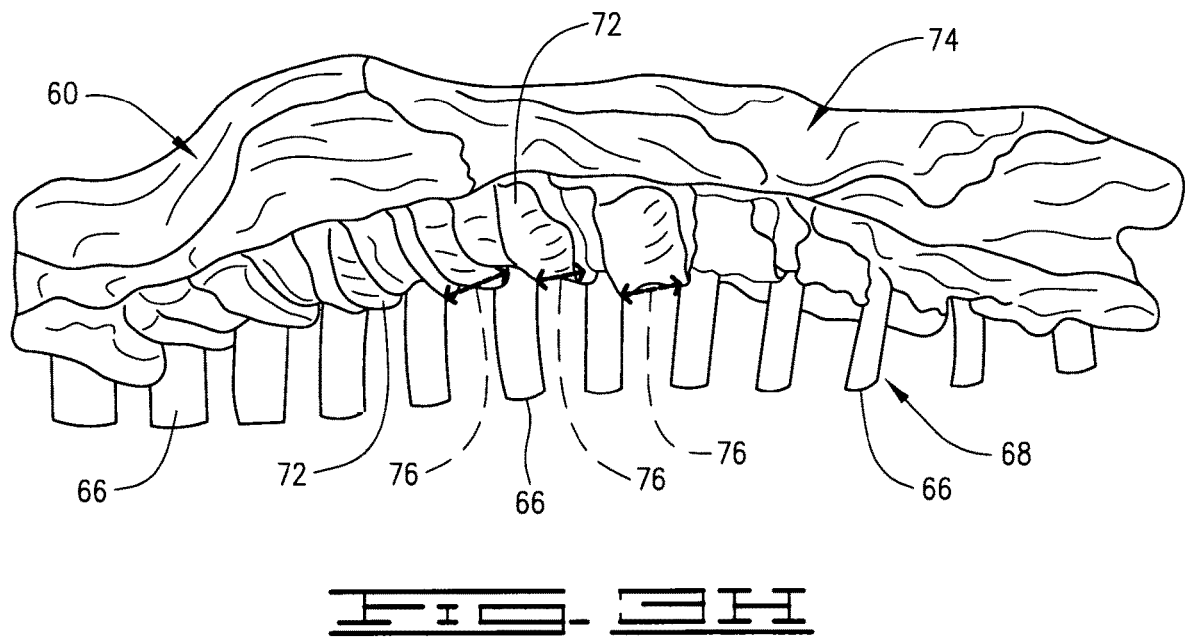
Figure 3I:
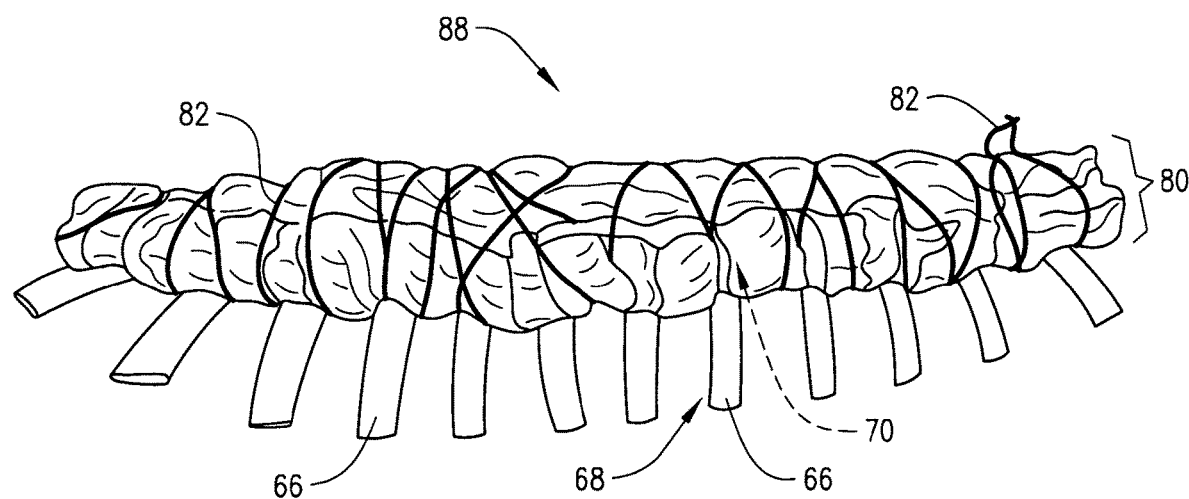
Figure 3J:
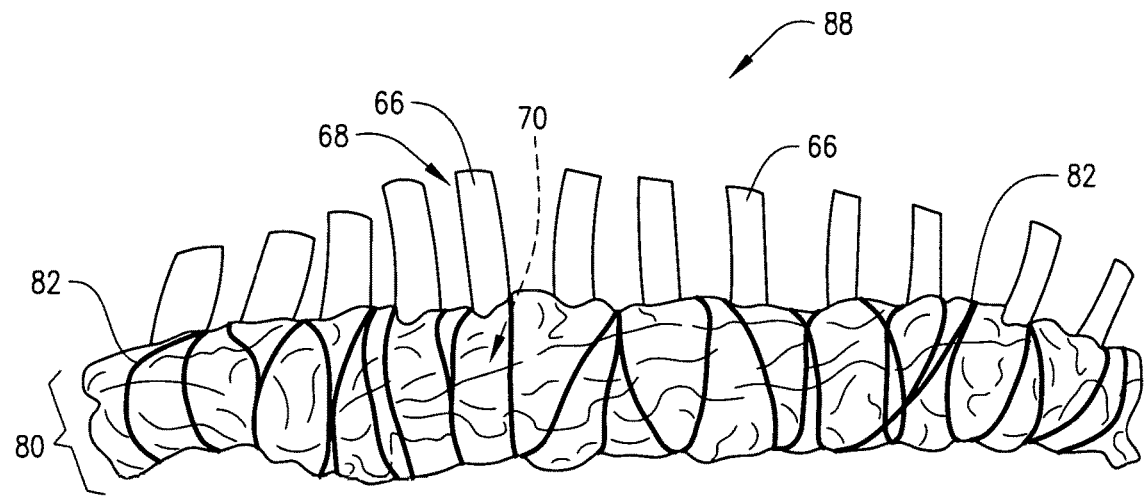
Figure 5I:
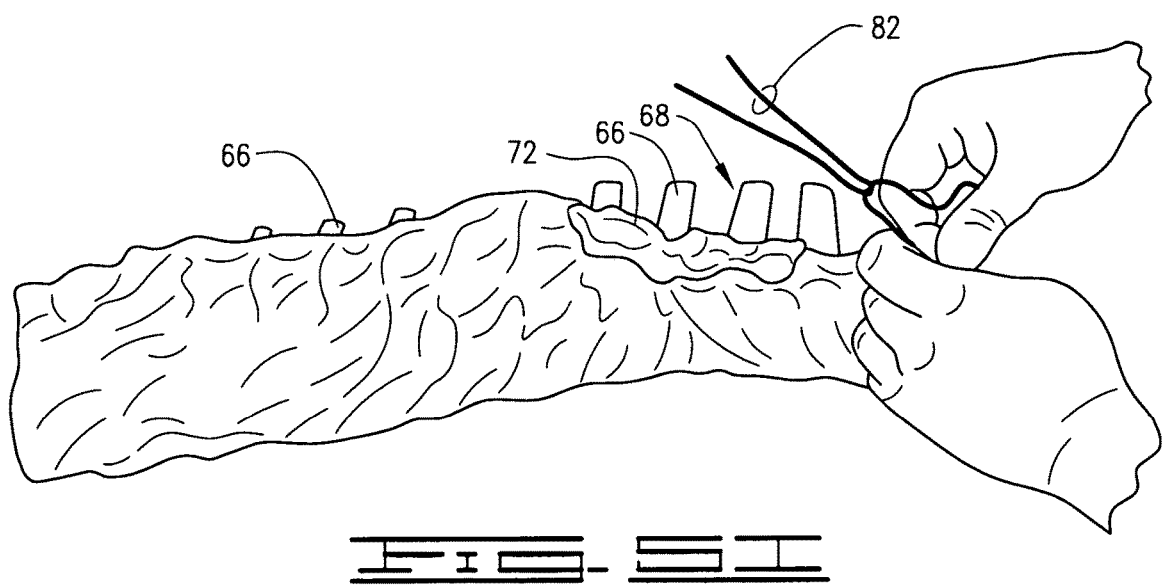
Figure 5A:
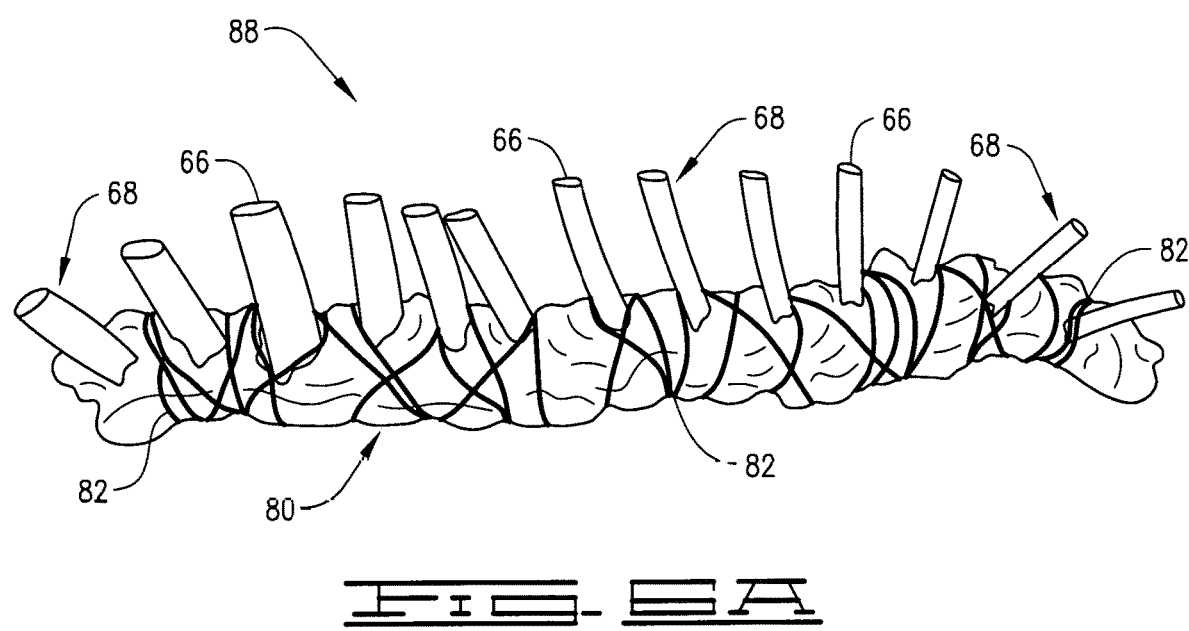
Figure 5D:
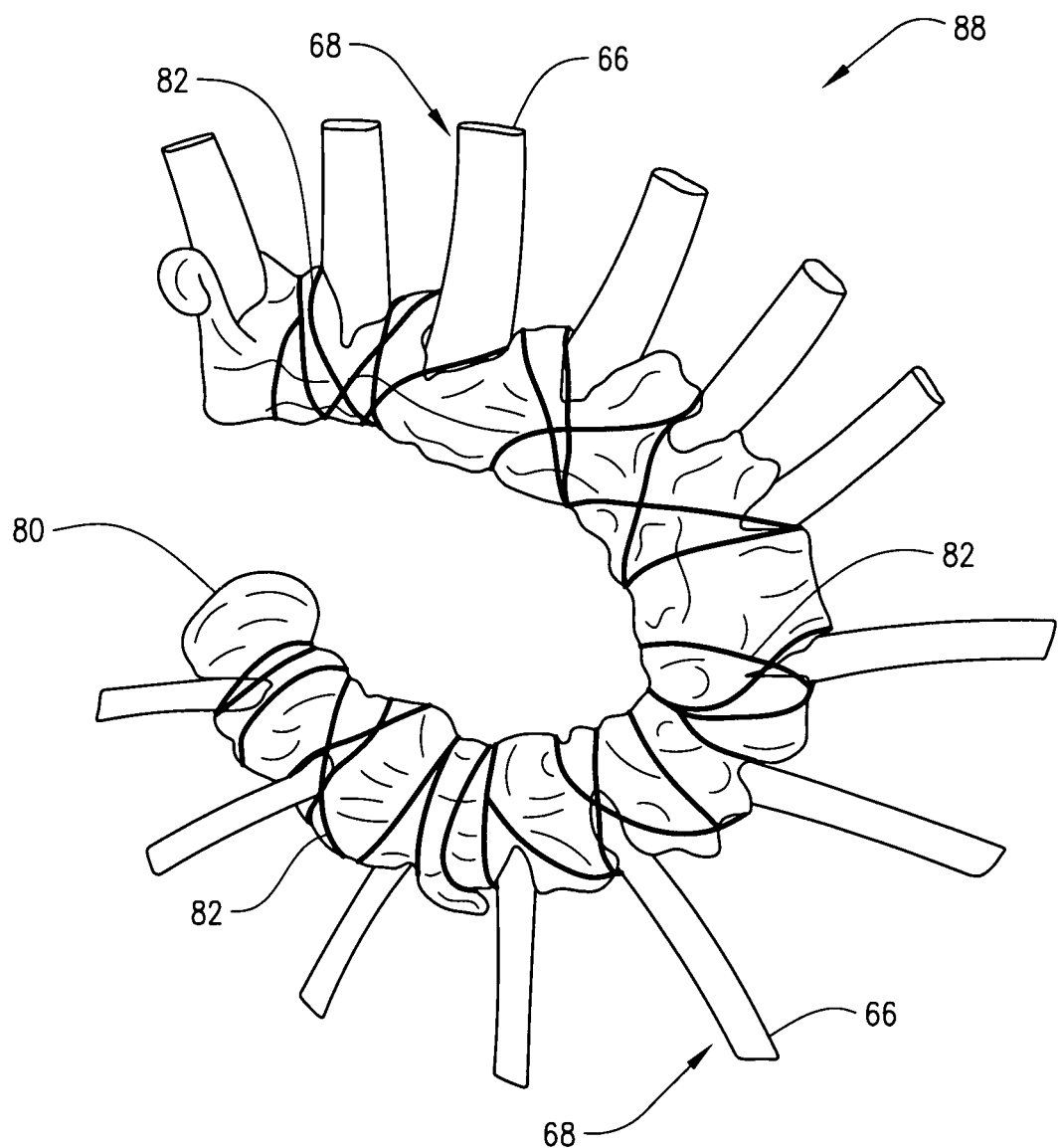

Method 31 includes folding step 46. Folding step 46 includes folding the intercostal meat flap 72 in a direction opposite of the same side that the scoring step 46 was carried out upon the slab of ribs to form a substantially cylindrically-shaped portion 80 of rib-meat that will ultimately span the entire length of the plurality or slab of ribs. FIGS. 3H and 5I depict folding step 46. Stated differently, FIGS. 3H and 5I depict the folding of the loosened intercostal meat 72 toward the second end 70 of each rib bone 66 and substantially around the meat remaining and attached to the rib bone 66 at the second end 70.

For example, with reference to FIG. 3H, the four meat flaps may be folded as follows to produce a generally-rounded cylindrically-shaped meat portion 80. Skirt flap 58 remains in its natural confirmation with the membrane-side of the skirt muscle contacting the internal cavity side of the sparerib. The pectoral flap 60 is folded over toward the meat-side (or distal side away from the cavity-side) of the slab of ribs. The entire length of the flank flap 74 is folded over toward the meat-side (or distal side away from the cavity-side) of the slab of ribs. The intercostal meat flap 72 is folded over toward the meat-side (or distal side away from the cavity-side) of the slab of ribs, i.e. in a direction opposite of the side the scoring step 40 was carried out upon. For example, if the scoring step was carried out on the cavity-side of the plurality of ribs, then the intercostal flap is folded toward the meat-side, in the same direction in which it was pushed through between the rib bones and vice versa if rib bones 66 were scored on the meat-side of the slab of ribs.

The intercostal flap 72 is folded over to partially cover the pectoral flap 60 and flank flap 74 and thereby form a substantially cylindrically-shaped portion of rib meat. The cross-sectional view of the substantially cylindrically-shaped portion of rib meat is similar to the letter O.

As used herein "substantially around" with respect to folding step 46 of method 31 means to position or wrap the loosened intercostal meat 72 around the meat remaining at the second end 70 in order to obtain a generally round shape. Depending on the amount of loosened intercostal meat 72, and the amount of meat for the pectoral flap 60 (if attached), the positioning thereof may not fully wrap around or fully enclose the remaining meat portion(s) at the second end 70, or may wrap around; however, so long as the resulting shape of folding step 46 is generally round in shape as shown and described herein, such satisfies the term "substantially around" as used herein.

Folding step 46 may include scoring a portion of the intercostal meat on the intercostal meat flap 72 as shown in FIG. 3H and designated with reference numeral 76. Score 76 is in a direction perpendicular to the length of each rib bone 66 and proximate to each rib bone. Score 76 may be a straight cut (or other suitable cut) along the edge of the individual rib bones to a depth of about 0.125 inches or less in order to score the heavy connective tissue membrane. To the extent score 76 is not done, during an optional cooking in finishing step 50, the membrane will shrink and cause the intercostal muscle meat to open or break from the round shape, similar to the letter "O" and form more of a shape similar to the letter "C". Score 76 in folding step 46 enables the rib-meat to remain in a substantially complete circle or "O" shape during cooking and not break and thus to prevent the retraction and opening of the muscle and maintain an overall consistent appearance in the resulting one or more cooked rib-meat products 88 and/or 84.

Method 31 includes securing step 48. Securing step 48 includes securing the substantially cylindrically-shaped portion 80 of rib meat and thereby form a rib meat product 88. FIG. 5I depicts securing step 48. FIGS. 3I, 3J, and 6A-7 depict various views of the result of securing step 48, specifically a secured rib-meat product 88. The securing step may be done by tying, including the use of manual tying, automated tying, clipping via plastic heat proof clips or rings, e.g. metal rings, or other securing methods and devices known in the art, or combinations of any of the foregoing. As part of securing step 48, the entire length of the sparerib may be tied tightly with a food grade approved polyester or cotton string 82. The string loop is placed over a first outer-most rib bone 66, wrapped around the circumference of the folded meat portion located at the non-exposed end of the rib bone and secured by looping over the adjacent rib bone 66. The process is repeated on each rib bone 66, moving from the shoulder end to the flank end (or vice versa) for the full length of the slab of ribs. Additional string loops may be added to ensure the generally-cylindrically-shaped meat portion 80 is wrapped and secured very tightly. If tying is used as the securing mechanism, the tying process may be done manually or automatically, e.g. using auto-tying equipment.

Folding step 46 and securing step 48 can be done sequentially, e.g. the entire slab is folded before securing step 48 commences, or in an alternating and iterative fashion, e.g. folding step 46 occurs for one or more meat portion and then securing step 48 commences on those folded portions and the process repeats until the entire slab of ribs is secured, as shown in FIG. 5I.

The diameter of the resulting rounded meat portion, e.g. portion 80 and/or roulade 86, from folding step 46 and securing step 48 is predicated on the length of each rib bone 66 and the amount of exposed bone 68 desired, the width of the pectoral flap 60 (if left attached), the width of skirt flap 58 (if left attached), and the width of flank flap 74 (if left attached).

The resulting rib-meat product 88 is depicted in FIGS. 3J and 6A-7. Rib-meat product 88 includes exposed portions of each rib bone 66 extending from the substantially cylindrically-shaped portion of rib-meat 80. Rib-meat product 88 has a plurality of rib bones 66. For example, rib-meat product 88 has 3-13 rib bones. For example, rib-meat product has 12 rib bones. Rib-meat product 88 may be formed of beef, pork, lamb, or bison meat.

Method 31 may include a finishing step 50. Finishing step 50 may include other processing, such as cleaning exposed rib bones 66 along the first end 68 to remove any residual meat that was not removed from the rib bone 66 during the prior steps and/or polishing the exposed rib bones 66 for aesthetically pleasing presentation. The cleaning and/or polishing step may be achieved via any cleaning or polishing process known in the art, including manual and automated cleaning devices and processes, and combinations of any of the foregoing.

Finishing step 50 may optionally include seasoning the secured rib-meat product 88. The seasoned or unseasoned secured rib-meat product 88 may be sold raw or cooked. If the resulting rib-meat product is to be sold cooked, finishing step may include a step of cooking. Prior to cooking in optional finishing step 50, and optionally, after loosening step 42 and prior to the folding step 46, the meat may be seasoned or stuffed by stuffing the interspace formed between the meat defined by the roulade 86, and/or stuffing between the present meat flaps (if the starting material left one or more of the pectoral flap 60, skirt flap 58, and flank flap 74 attached). The stuffing may be any combination of meat farce, bread based stuffing, cheese, vegetable, etc.

If rib-meat product 88 is to be served cooked, method 31 may also include the step of removing the securing device 82 used in the securing step 48, and optionally separating or cutting rib-meat product 88 into a plurality of pieces, wherein cutting occurs between each exposed rib bone. The cooking step can be achieved by any cooking methodology and technique known in the art, including without limitation, sous vide, smoking, open-rack smoking rib cycles, or a wet cycle without smoke. If the meat was secured using a physical device, such as netting, string, pins, etc. such securing mechanism may be removed following any cooking step.

If the rib-meat product 88 is secured well enough, it may also be cut into a plurality of smaller pieces between each rib bone without prior cooking, including rib-meat product 84 having a single rib bone 66. FIGS. 4A and 4B depict individual rib-meat products 84 in a cooked state where such rib-meat products 84 each have one rib bone 66. Whether cooked or uncooked, individual rib-meat product 84 includes a generally round and cylindrically-shaped meat portion referred to herein as roulade 86 on the second end 70 of rib bone 66 with the first end 68 of rib bone 66 exposed and capable of serving as a handle, similar to a lollipop.

FIGS. 4A and 4B depict individual rib-meat products 84 in a cooked state where pectoral flap 60 was not removed from the starting material 54 of a St. Louis-style sparerib. Also visible in FIG. 4A is cartilage 90 that was not removed during steps 32 and 36, removing bone and removing other matter, respectively, of method 31.

When the pectoral flap 60 is included, the resulting generally cylindrically-shaped portion 80 and roulade 86 attached to rib bone(s) 66 is larger compared with the resulting generally cylindrically-shaped portion 80 and roulade 86 attached at the second end 70 of the rib bone 66 when the pectoral flap 60 is removed.

As previously described, method 31 may also be used with back ribs from the loin 2. As applied to back ribs, there is no need for some or all of steps 32 and 36, e.g. step 34 of removing the sternum and/or the optional step 38 of removing the pectoralis profundi muscle, pectoral flap 60 as previously discussed.

The rib-meat products resulting from the described method 31 may be considered as alternative products to a pork wing, which is made from the hind hock and each carcass is capable of only yielding two. The resulting rib-meat products of the presently disclosed method are capable of yielding up to forty-eight individual rib-meat products 84 if using the back rib and sparerib from both sides of the pork carcass.

The presently disclosed method is also suitable for use as an alternative to the fabrication of the other meat products. For example, to the extent back ribs of the carcass were damaged in the manufacture of a different back rib product or generally damaged during the processing of the carcass, the damaged slab, rack, or portion of back ribs can be repurposed and undergo the steps of the described method 31 and produce the rib-meat products associated therewith. Similarly, to the extent the sparerib of the carcass was damaged in the manufacture of a different sparerib product or generally damaged during the processing of the carcass, the damaged sparerib can be repurposed and undergo the steps of the described method 31 and produce the rib-meat products associated therewith.

The presently disclosed methods, techniques, and products provide meat fabricators with many advantages and benefits. For example, in the case of pork carcasses, recently, the value of ribs has decreased as compared to the rest of the carcass. For example, in the United States, rib products tend to be consumed during the warmer months or seasons, e.g., spring-early fall, or the consumer seasons known as "grilling season" or "outdoor game season" such as football or baseball season. Fabricators produce and store ribs in frozen form in preparation to the applicable season where demand for ribs is higher. As a result, fabricators may or may not experience a surplus of rib products that may not be consumed during the specific season due to forecasted demands. The presently disclosed methods, techniques, and products are capable of providing a rib-meat product that is easy to consume and can be consumed year-round. The rib-meat products and methods for producing the same allows for new cuts and products on the market and creates a more sustainable value in the rib sub-primal throughout the complete year instead of the seasonal demand swings in the various rib products.

For example, the overall eating experience for a consumer, when comparing the rib meat products described herein in connection with the method to the traditional rib products of back ribs or St. Louis ribs, is that there is more meat per pound of product. Meaning, for example, that for a twelve bone rack of back ribs or St. Louis rib each having about three pounds (lb) total weight, approximately seventy percent (70%) of the weight is the meat. Whereas the rib-meat products described herein in connection with the presently disclosed method has a higher percentage of meat in relation to bone. In addition, the profile of the meat products described in relation to the presently described method takes up less space than a full rack of ribs. For example, a retail and/or food-service operator will be able to have more throughput in its smoker or cooker per smoking cycle compared to a full rack of ribs. The retail and/or food-service operator may also be able to serve fewer numbers of ribs per customer and get more throughput in the number of diners that can be fed at any given time. Stated another way, in the space that a three pound rack of back ribs or St. Louis rib occupied in a smoker, two slabs of the meat product depicted, for example, in FIGS. 3I and 3J, may weigh approximately five pounds each for a total of about fifteen pounds, thereby demonstrating that the disclosed method and products can provide about one-hundred and fifty percent (150%) increase in throughput.

The disclosed method 31 is capable of producing a boneless rib meat product that can be valued up beyond its alternative trim value. The described method 31 may also be used in connection with other animal carcasses, for example, including but not limited to, beef, lamb, bison, venison, goat, ostrich, alligator, llama, kangaroo, etc.

The new processing and cutting techniques of the described methods herein and the associated meat product and/or meat products produced by the applicable method allow fabricators to more effectively utilize animal carcasses.

Although certain steps are described herein and illustrated in the figures as occurring sequentially, some steps may occur simultaneously with each other or in an order that is not depicted. The present disclosure of the disclosed methods, techniques, functions, and products produced therefrom are not to be limited to the precise descriptions and illustrations. Other embodiments will be apparent to one skilled in the art. As such, the foregoing description merely enables and describes the general products, methods, and uses disclosed herein. While certain embodiments have been described for the purpose of this disclosure, those skilled in the art can make changes without departing from the spirit and scope thereof. Thus, the appended claims define what is claimed.

What is claimed is:

1. A method of forming a rib-meat product, the method comprising the steps of:
    scoring each rib bone on a same side of a slab of ribs for a length less than a total length of said rib bone;
    loosening intercostal meat from each rib bone along said length of each score to produce an intercostal meat flap;
    folding the intercostal meat flap in a direction opposite of the same side that the scoring step was carried out upon of the slab of ribs to form a substantially cylindrically-shaped portion of rib-meat; and
    securing the substantially cylindrically-shaped portion of rib-meat and thereby forming said rib-meat product.

2. The method of claim 1, wherein the scoring of each rib bone on a slab of ribs step is performed on a cavity-side of said slab of ribs.

3. The method of claim 2, wherein, when said slab of ribs includes a skirt flap, a pectoral flap, and a flank flap, the folding step includes folding the pectoral flap and flank flap toward a distal side of said slab of ribs and away from said cavity-side of said slab of ribs, and folding of the intercostal flap to partially cover the folded pectoral flap and flank flap to produce the substantially cylindrically-shaped portion of rib-meat.

4. The method of claim 1, wherein said length of the scoring of each rib bone on a slab of ribs step is between a first end of said rib bone and a point of said rib bone near a second of said rib bone.

5. The method of claim 1, wherein said length of the scoring of each rib bone on a slab of ribs step is approximately two-thirds of said total length of said rib bone between a first end of said rib bone and a second end of said rib bone.

6. The method of claim 1, wherein said length of the scoring of each rib bone on a slab of ribs step is between a first end of said rib bone to a portion of said rib bone substantially near and not including a union of costal cartilage and bone on said rib bone.

7. The method of claim 1, wherein said slab of ribs is a plurality of ribs connected together.

8. The method of claim 7, wherein said plurality of ribs is 3-14 rib bones.

9. The method of claim 1, wherein said slab of ribs is 3-14 rib bones.

10. The method of claim 1, wherein said loosening step includes loosening a pleural membrane lining from a circumference of each of said rib bones.

11. The method of claim 1, wherein exposed portions of each rib bone extend from said substantially cylindrically-shaped portion of rib-meat.

12. The method of claim 1, wherein the folding step includes scoring a portion of said intercostal meat on said intercostal meat flap, wherein such scoring is in a direction perpendicular to said length of each rib bone and proximate to each rib bone.

13. The method of claim 12, wherein in the scoring a portion of said intercostal meat on said intercostal flap, said intercostal meat is scored to a depth of about 0.125 inches or less.

14. The method of claim 1, wherein, when said slab of ribs includes a pectoral flap, and a flank flap, the folding step includes folding of the intercostal flap to partially cover a folded pectoral flap and a folded flank flap to produce the substantially cylindrically-shaped portion of rib-meat.

15. The method of claim 1, wherein the securing step is performed by tying said substantially cylindrically-shaped portion of rib-meat around its circumference and between one or more rib bones spanning said slab of ribs.

16. The method of claim 1 further comprising the step of: after the step of loosening and before the step of folding, seasoning said slab of ribs.

17. The method of claim 1 further comprising the step of: before the step of scoring each rib bone on a slab of ribs, removing materials from said slab of ribs.

18. The method of claim 17, wherein the removing materials step includes removing one or more bones from said slab of ribs.

19. The method of claim 18, wherein the removing one or more bones from said slab of ribs includes removing a sternum bone.

20. The method of claim 18, wherein the removing one or more bones from said slab of ribs includes removing a rib bone on an anterior end of said slab of ribs or removing one or more rib bones on a posterior end of said slab of ribs, wherein said one or more rib bones on said posterior end are floating rib bones.

21. The method of claim 17, wherein the removing materials step includes removing one or more flaps of meat from said slab of ribs, said one or more flaps of meat include a skirt flap and a pectoral flap.

22. The method of claim 1 further comprising the step of: cooking the rib-meat product.

23. The method of claim 22 further comprising the step of: cutting the rib-meat product.

24. The method of claim 23, wherein the cut rib-meat product has 1 rib bone.

25. The method of claim 1, wherein said rib-meat product is that of beef, pork, lamb, or bison.

26. The method of claim 25, wherein said rib-meat product is that of pork.

27. The method of claim 25, wherein said rib-meat product is that of beef.

28. The method of claim 1, wherein said rib-meat product has 3-13 rib bones.

29. The method of claim 28, wherein said rib-meat product has 12 rib bones.

30. The meat product produced by the method of claim 1.

31. A method comprising the steps of:
   on a cavity side of a slab of ribs, scoring each rib bone of said slab of ribs for a length less than a total length of each of said rib bones, each of said rib bones having a first end and a second end;
   loosening intercostal meat from each rib bone along the length of each score;
   folding said loosened intercostal meat away from said cavity side and toward said second end of each rib bone to substantially wrap said loosened intercostal meat around meat remaining on said second end of each rib bone to form a generally cylindrically-shaped meat portion spanning a length of said slab of ribs; and
   securing said folded loosened intercostal meat and said remaining meat on said second end together and thereby form a rib-meat product.

32. The method of claim 31, wherein said slab of ribs is that of beef, pork, lamb, or bison.

33. The method of claim 32, wherein said slab of ribs is that of pork.

34. The method of claim 32, wherein said slab of ribs is that of beef.

35. The method of claim 31, wherein said rib-meat product has 3-13 rib bones.

36. The meat product produced by the method of claim 31.

37. A rib-meat product comprising:
   a rib bone having a first end and a second end; and
   a meat roulade attached to said second end of said rib bone, wherein said meat roulade is a continuous piece of meat originally present on said rib bone, wherein said meat roulade includes a flap portion and a stationary portion, wherein said stationary portion is adhered to and joined with said second end of said rib bone, wherein said flap portion has been partially detached from said first end of said rib bone and is substantially wrapped around said stationary portion; and wherein said first end of said rib bone is exposed bone extending from said meat roulade.

38. The rib-meat product of claim 37, wherein said flap portion is intercostal meat.

39. The rib-meat product of claim 37, wherein said rib-meat product is that of beef, pork, lamb, or bison.

40. The rib-meat product of claim 39, wherein said rib-meat product is that of pork.

41. The rib-meat product of claim 39, wherein said rib-meat product is that of beef.

42. A rib-meat product comprising:
   a plurality of rib bones, each rib bone having a first end and a second end; and
   a substantially cylindrically-shaped meat portion attached to said second end of each of said rib bones in said plurality of rib bones, wherein said substantially cylindrically-shaped meat portion is a continuous piece of meat originally present on said plurality of rib bones, wherein said substantially cylindrically-shaped meat portion includes a flap portion and a stationary portion, wherein said stationary portion is adhered to and joined with said second end of each of said rib bones in said plurality of rib bones, wherein said flap portion has been partially detached from each of said first ends of said plurality of rib bones and is substantially wrapped around said stationary portion; and wherein each of said first ends of said plurality of rib bones is exposed bone extending from said substantially cylindrically-shaped meat portion.

43. The rib-meat product of claim 42, wherein said flap portion is intercostal meat.

44. The rib-meat product of claim 42, wherein said rib-meat product is that of beef, pork, lamb, or bison.

45. The rib-meat product of claim 44, wherein said rib-meat product is that of pork.

46. The rib-meat product of claim 44, wherein said rib-meat product is that of beef.

\* \* \* \* \*